United States Patent
Pimouguet

(10) Patent No.: US 6,742,541 B2
(45) Date of Patent: Jun. 1, 2004

(54) LINEAR INDICATOR FOR A VALVE

(75) Inventor: Olivier Denis Pimouguet, Lucé (FR)

(73) Assignee: ASCO Controls, LP, Florham, NJ (US)

( * ) Notice: Subject to any disclaimer, the term of this patent is extended or adjusted under 35 U.S.C. 154(b) by 167 days.

(21) Appl. No.: 10/127,020

(22) Filed: Apr. 19, 2002

(65) Prior Publication Data

US 2002/0157713 A1 Oct. 31, 2002

Related U.S. Application Data

(60) Provisional application No. 60/284,839, filed on Apr. 19, 2001, now abandoned.

(51) Int. Cl.$^7$ ................................................ F16K 37/00
(52) U.S. Cl. ........................................ 137/554; 552/553
(58) Field of Search ................................ 137/552, 553, 137/554, 556, 556.3, 556.6

(56) References Cited

U.S. PATENT DOCUMENTS

| | | | |
|---|---|---|---|
| 2,505,809 A | 5/1950 | Svenson | 60/52 |
| 2,533,491 A | 12/1950 | McMahon et al. | 137/139 |
| 3,148,701 A | 9/1964 | Bagwell | 137/556 |
| 3,238,968 A | 3/1966 | Pecis | 137/556 |
| 3,247,824 A | 4/1966 | Rodgers | 116/70 |
| 3,390,943 A | 7/1968 | Myers | 431/78 |
| 3,789,875 A | 2/1974 | McGee | 137/553 |
| 3,804,056 A | 4/1974 | Lee et al. | 116/125 |
| 4,494,566 A | 1/1985 | Sinclair et al. | 137/556 |
| 4,858,937 A | 8/1989 | Fairlie-Clarke et al. | 277/2 |
| 5,218,994 A | 6/1993 | Jeschke | 137/554 |
| 5,305,781 A | 4/1994 | Raymond, Jr. et al. | 137/554 |
| 5,469,805 A | 11/1995 | Gibbs | 116/284 |
| 5,535,698 A | 7/1996 | Trevisan | 116/277 |
| 5,564,677 A | 10/1996 | Levy et al. | 251/129.12 |
| 5,609,185 A | 3/1997 | Booth et al. | 137/556 |
| 5,623,963 A | 4/1997 | Stommes et al. | 137/554 |
| 5,685,336 A | 11/1997 | Heiniger | 137/554 |
| 5,771,926 A | 6/1998 | Medal et al. | 137/554 |
| 5,957,158 A | 9/1999 | Volz et al. | 137/556 |
| 6,044,791 A | 4/2000 | LaMarca et al. | 116/277 |
| 6,242,909 B1 | 6/2001 | Dorsey et al. | 324/207.25 |

OTHER PUBLICATIONS

International Search Report for PCT Application No. PCT/US 02/12503 dated Sep. 24, 2002.

*Primary Examiner*—John Rivell
(74) *Attorney, Agent, or Firm*—Howrey Simon Arnold & White LLP

(57) ABSTRACT

A linear actuator monitors and distinguishes between the open and closed states of a valve. The states of the actuator are monitored electrically by two switches and visually via a mechanical indicator. The electrical switches are initialized by an adjustable system, according to the random position of the valve stem when it is opened or closed. The visual indicator is also adjusted to an initial position corresponding to the valve stem position. The adjustment of the system allows for flexibility and use on a wide range of valve stems with various stroke lengths. The visual indicator is visible from the top and the sides of the unit. It is visible on the circumference of the unit so that it is visible at an angle as well. The visual indicator matches three possible states of the valve as follows: when the valve is closed, the indicator is not visible, when the valve is either opening or closing, only one indication area is visible, and when the valve is fully open, two indication areas are visible.

26 Claims, 18 Drawing Sheets

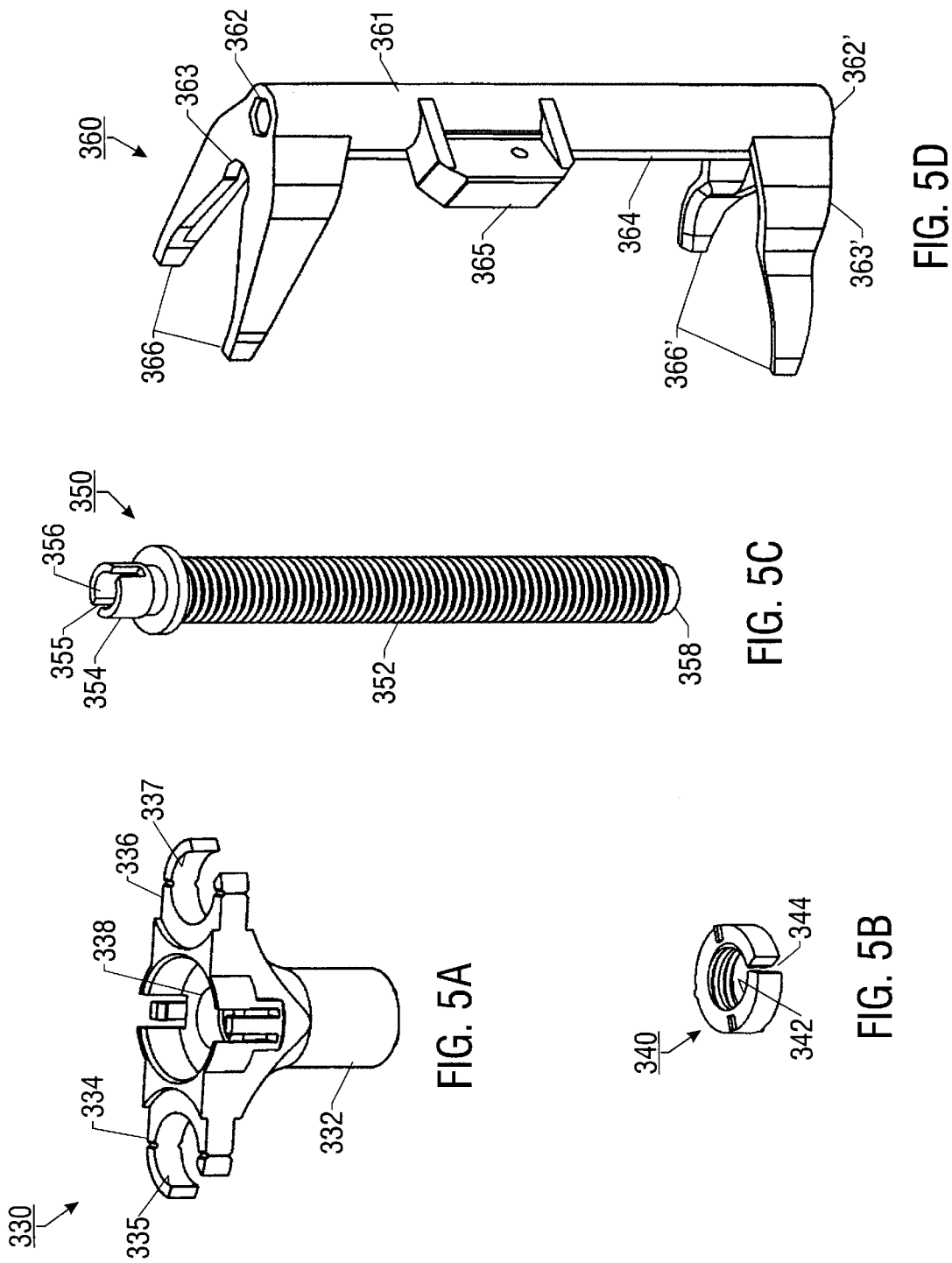

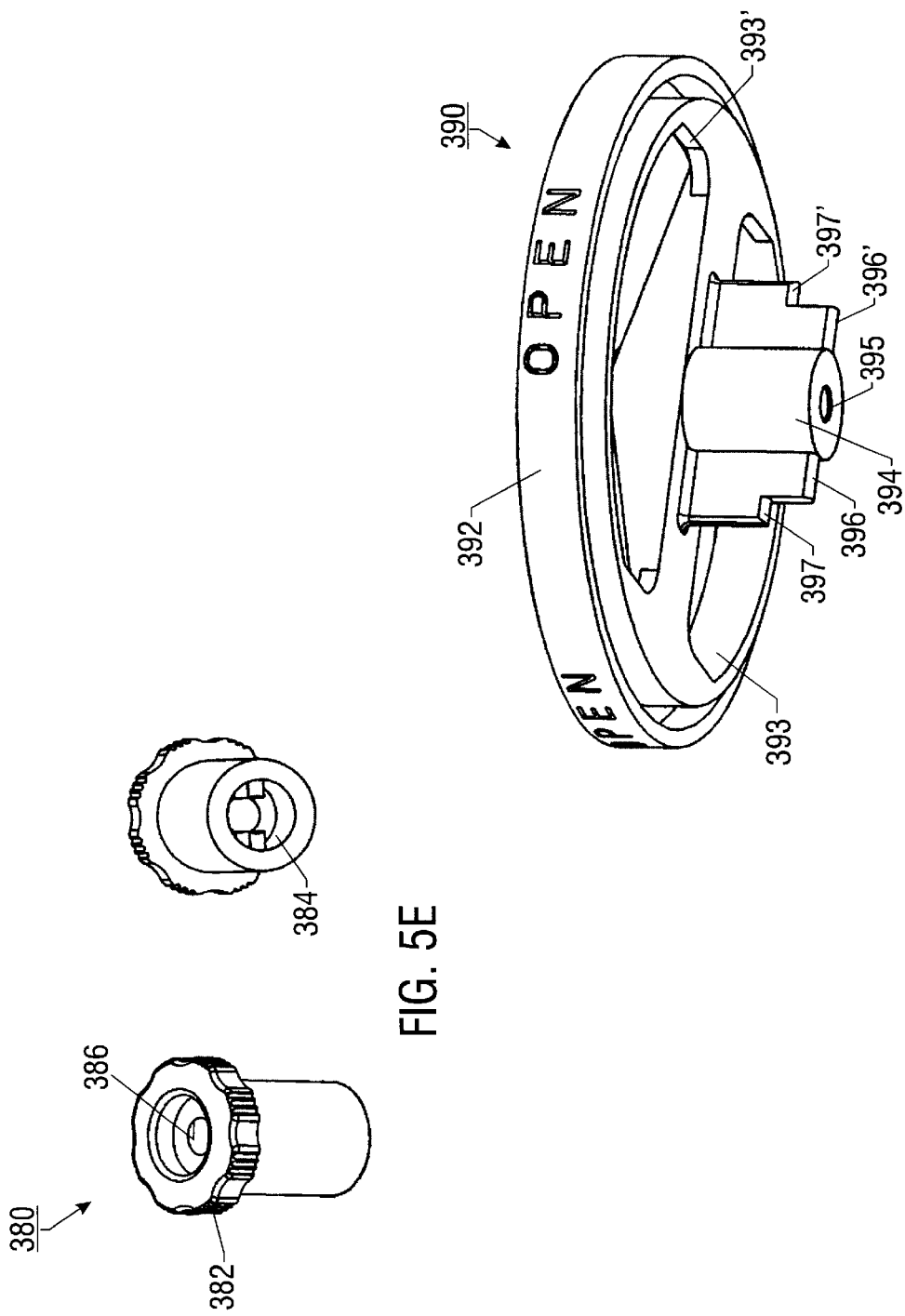

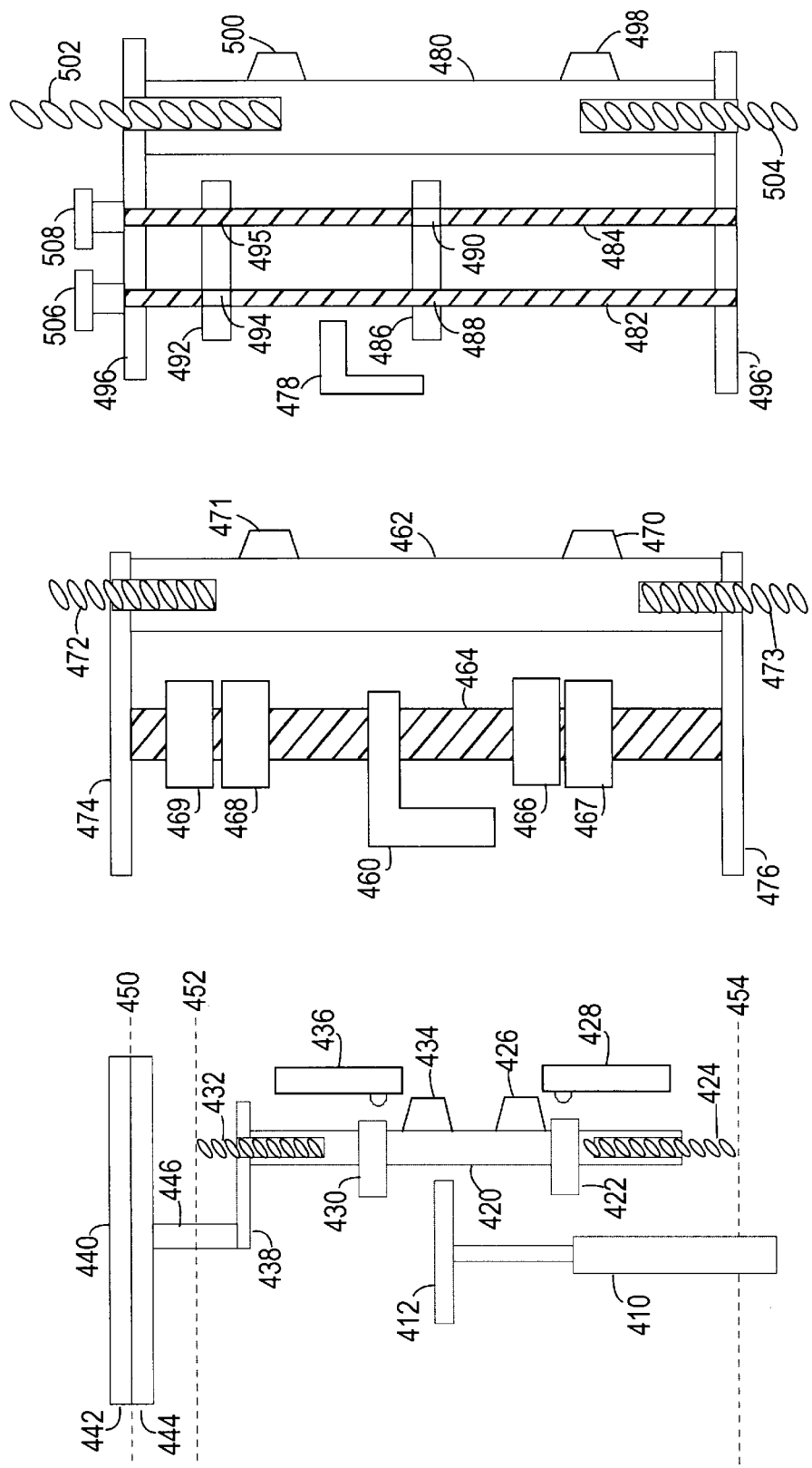

LINEAR INDICATOR FOR A VALVE

CROSS-REFERENCE TO RELATED APPLICATIONS

This application claims the benefit of the U.S. Provisional Application No. 60/284,839 filed Apr. 19, 2001 now abandoned.

FIELD OF THE INVENTION

The present invention relates generally to valve indicators, and more particularly to a valve indicator for visually and/or electronically indicating the position of a valve shaft.

BACKGROUND OF THE INVENTION

Various electrical and mechanical position indicators are used to indicate the position of pneumatic or hydraulic lift valves. Switches are activated in respective end positions of the valve stroke, creating an electrical signal for open and closed-valve positions. The signal can then be transmitted to a control unit. Similarly, visual indication can also be provided to display the open and closed positions of the valve.

FIGS. 1A–1C illustrate some of the electrical and/or visual solutions for providing linear position indication for a valve. FIG. 1A illustrates a principle used in the art for providing electrical indication of the position of a valve stem. The valve stem 10 has an adapter 12 attached. The adapter 12 activates a first switch 20 when the valve stem 10 is at a position where the valve is closed. The first switch 20 is adjustable along a fixed shaft 22. Thus, moving switch 20 along the shaft 22 changes the position for indicating a closed-valve. A shaded area 24 represents the area in which a closed-valve position can be adjusted.

The adapter 12 activates a second switch 30 when the valve stem 10 is at an open position. The second switch 30 also adjustable along a fixed shaft 32. Thus, moving the switch 30 along the shaft 32 changes the position for indicating an open-valve. A shaded area 34 indicates the area in which the open-valve position can be adjusted and the switch 30 is triggered. With the present arrangement, however, providing visual indication for the position of valves with various stroke lengths is not readily evident.

FIG. 1B illustrates another principle used in the art for providing indication of the position of a valve. Referring to the schematic diagram of FIG. 1B, the apparatus for monitoring valve lift has two adjusters 14 and 16, which activate two limit switches 20 and 30, respectively. The switches 20, 30 act as position sensors for the up and down positions of a drive spindle 12. The present arrangement allows for the adjusters 14 and 16 to be moved so that they activate the limit switches 20, 30 in the open and closed positions for a given valve stroke.

The drive spindle 12 has the same stroke length as the valve stem 10. Hence, the arrangement does not readily offer a solution to provide a visual indicator among valves having different stroke lengths. The visual indicator 40 would have the same display length 42 as the stroke length 18 of the valve stem 10. Therefore, the visual indicator 40 would display different amounts of visual area for valves having different stroke lengths.

FIG. 1C illustrates yet another principle used in the art for providing indication of the position of a valve. The valve stem 10 has an adapter 12 attached. An adjuster 14 activates a first switch 20 when the valve stem 10 is at a closed-valve position. The adjuster 14 is adjustable along adapter 12. A shaded area 24 represents the area in which the closed-valve position can be adjusted and the switch 20 is triggered.

Another adjuster 16 activates a second switch 30 when the valve stem 10 is at an open-valve position. The adjuster 16 is adjustable along adapter 12. Thus, moving the adjuster 16 along the adapter 12 changes the position for indicating an open-valve. A shaded area 34 represents the area in which the open-valve position can be adjusted and the switch 30 is triggered.

With the present arrangement, a visual indicator 40 for indicating the position of the valve would have an indication length 42 that is equal to the stroke length 18 minus the separation H between the two adjusters 14, 16. Thus, it is not clear how a single visual indicator could be adapted to the present arrangement for use on valves with various stroke lengths.

The present invention is directed to providing a visual and electrical indicator for valves with various lengths of valve strokes.

SUMMARY OF THE INVENTION

In view of the foregoing and other considerations, the present invention relates to an apparatus for visually and/or electronically indicating the position of a valve shaft.

In accordance with one aspect of the present invention, there is provided an apparatus for indicating a state of a valve. The valve has a stem being movable in closing and opening directions between closed and open valve positions. The apparatus includes a first cam system being biased in the opening direction. The first cam system is capable of adjustably engaging the stem when the stem is adjacent to the closed valve position and is movable by the stem in the closing direction once engaged. The apparatus also includes a second cam system being integral to or separate from the first cam system and being biased in the closing direction. The second cam system is capable of adjustably engaging the stem when the stem is adjacent to the open valve position. The second cam system is movable by the stem in the opening direction once engaged. The apparatus includes an indicator moveable by the first and the second cam systems. The indicator is capable of indicating at least open, intermediate, and closed states of the valve.

In accordance with another aspect of the present invention, there is provided an apparatus for visually and electronically indicating a state of a valve. The valve has a stem being movable in closing and opening directions between closed and open valve positions. The apparatus includes a first cam system, a first switch, a second cam system, a second switch, and an indicator. The first cam system includes a first adjustable member engaging the stem when the stem is adjacent to the closed valve position. The first cam system is movable by the stem in a closing direction once engaged. The first cam system also includes a first biasing member forcing the first cam system in the opening direction. The first switch is capable of being actuated by the first cam system when the stem is at the closed valve position. The second cam system is integral to or separate from the first cam system. The second cam system includes a second adjustable member engaging the stem when the stem is adjacent to the open valve position. The second cam system is movable by the stem in the opening direction once engaged. The second cam system also includes a second biasing member forcing the second cam system in the closing direction. The second switch is capable of being actuated by the second cam system when the stem is at the open valve position. The indicator is moveable by the first and the second cam systems and is capable of indicating at least open, intermediate, and closed states of the valve.

In accordance with yet another aspect of the present invention, there is provided a method for indicating states of a valve having a stem. The stem is movable in closing and opening directions between closed and open valve positions. The method includes the steps of: adjusting a first cam system to engage the stem adjacent the closed valve position and adjusting a second cam system to engage the stem adjacent the opened valve position. The method also includes indicating a closed-valve state by displacing the first cam system in the closing direction with the stem to the closed valve position and indicating an open-valve state by displacing the second cam system in the opening direction with the stem to the opened valve position. The method also includes indicating an intermediate-valve state in the absence of engagement of the stem with the first and second cam system by biasing the first cam system in the opening direction and biasing the second cam system in the closing direction.

The foregoing summary is not intended to summarize each potential embodiment, or every aspect of the invention disclosed herein, but merely to summarize the appended claims.

BRIEF DESCRIPTION OF THE DRAWINGS

A preferred embodiment and other aspects of the present invention will be best understood with reference to a detailed description of specific embodiments of the invention, which follows, when read in conjunction with the accompanying drawings, in which:

FIG. 5A illustrates an exemplary embodiment of an adapter;

FIG. 5B illustrates an exemplary embodiment of a threaded split ring;

FIG. 5C illustrates an exemplary embodiment of a threaded rod;

FIG. 5D illustrates an exemplary embodiment of a cam holder;

FIG. 5E illustrates an exemplary embodiment of an adjustment knob;

FIG. 5F illustrates an exemplary embodiment of a visual indicator;

FIG. 7 illustrates another embodiment of a linear indicator according to the present invention;

FIG. 8 illustrates another embodiment of the resent invention; and

FIG. 9 illustrates an additional embodiment of the present invention.

Figure 1A:
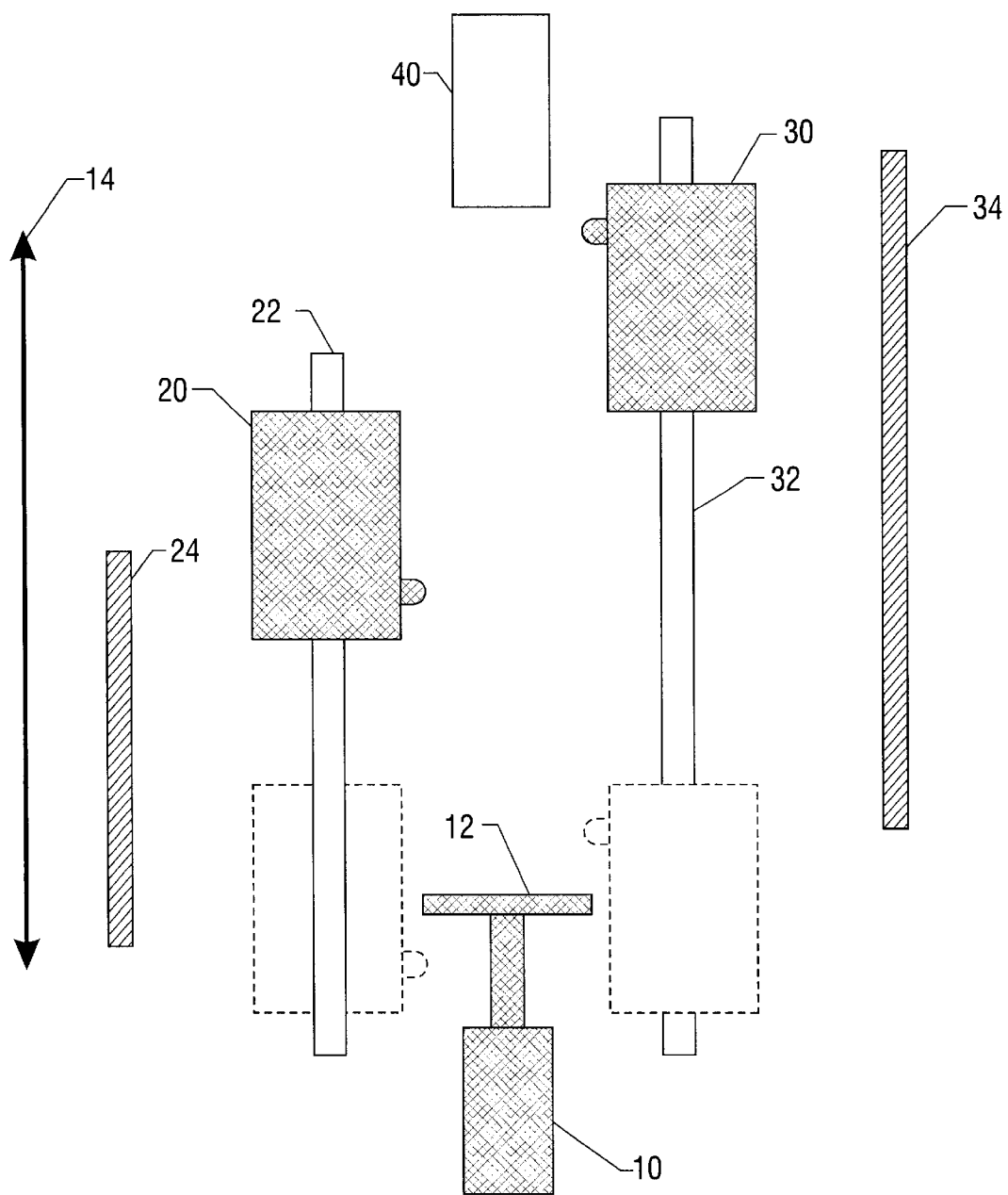
FIGS. 1A–C illustrate prior art solutions for valve position indicators.
Figure 1B:
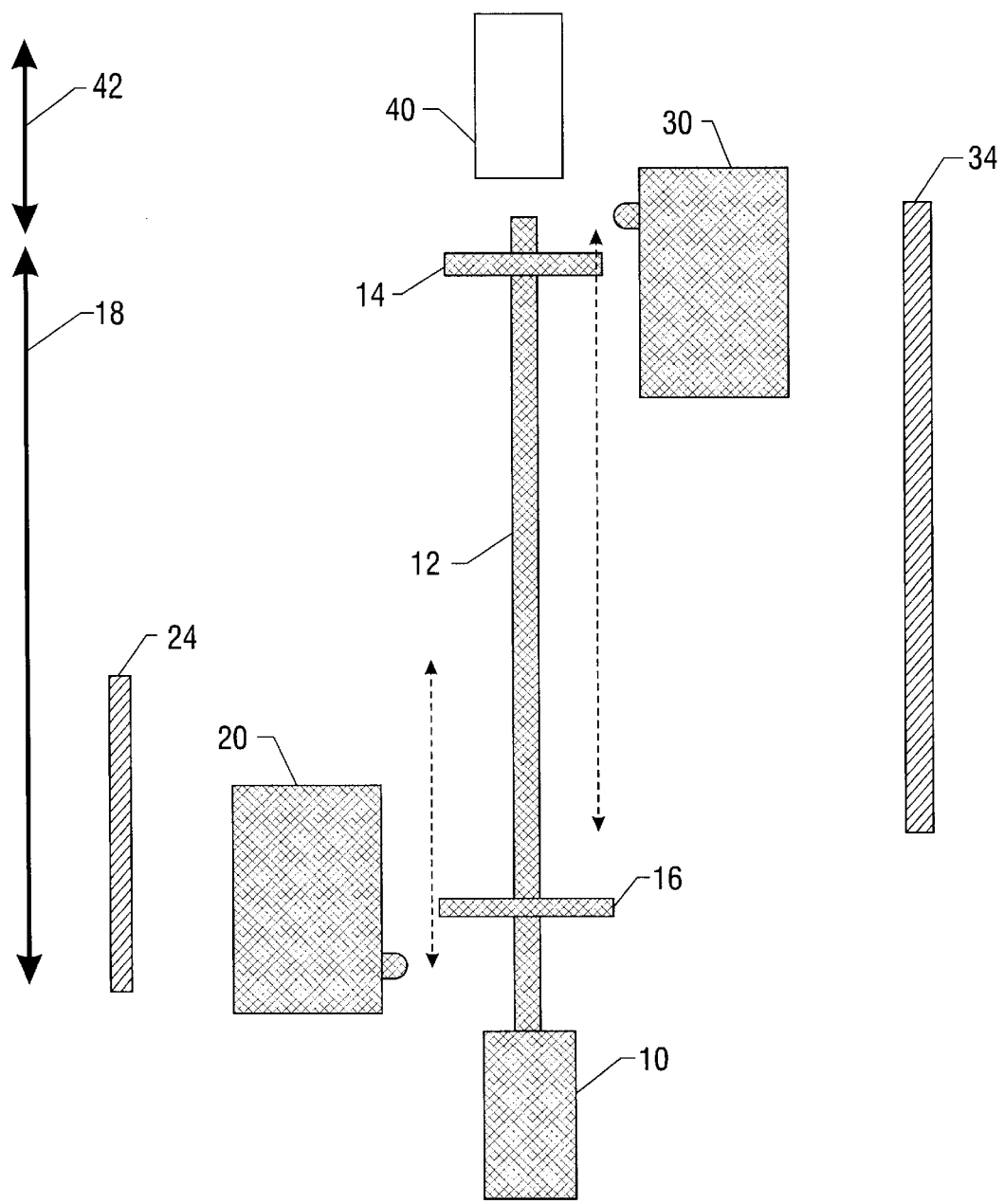
Figure 1C:
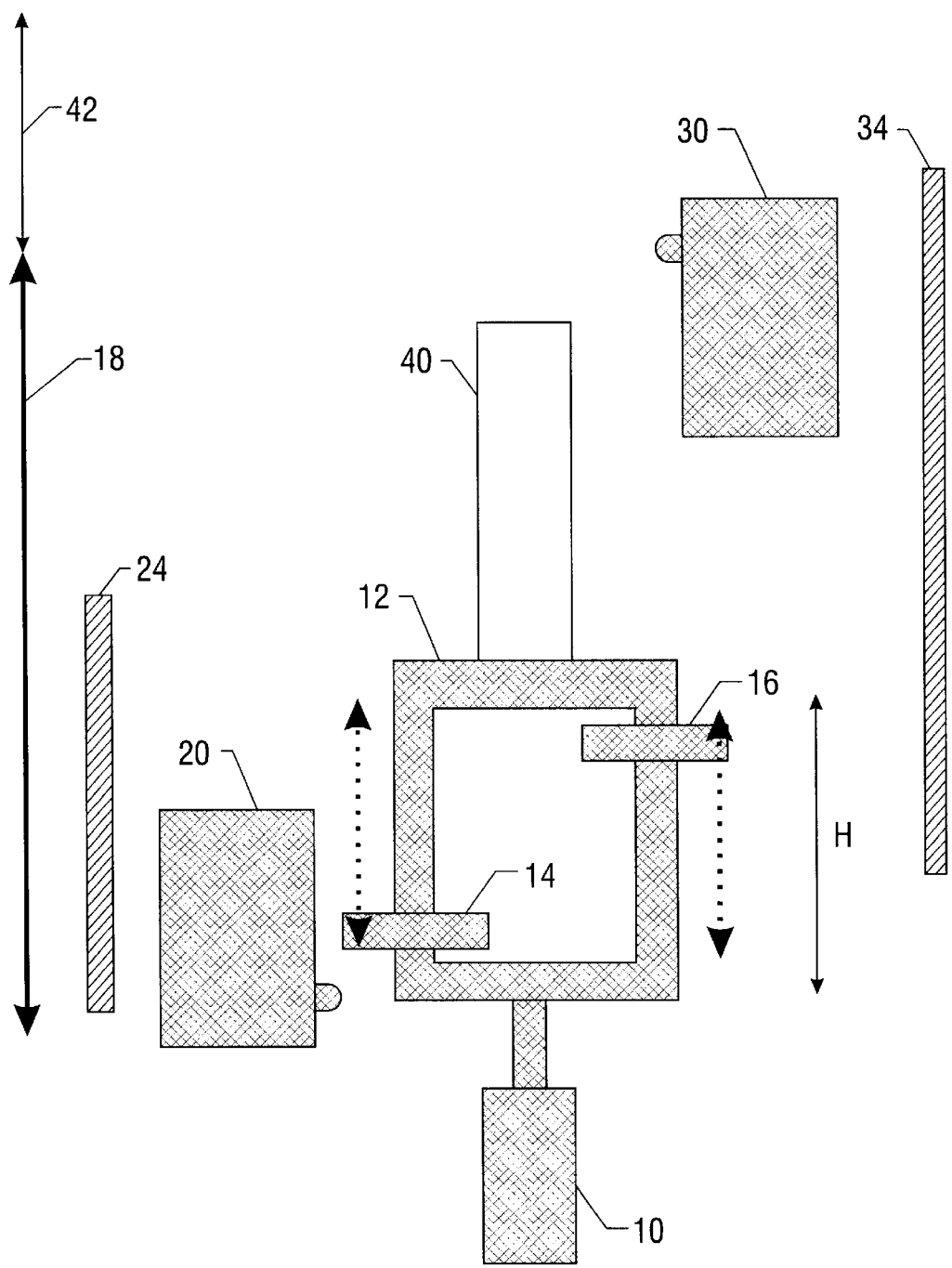

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modification, equivalents and alternatives falling within the scope of the invention as defined by the appended claims.

DETAILED DESCRIPTION OF THE INVENTION

Figure 2A:
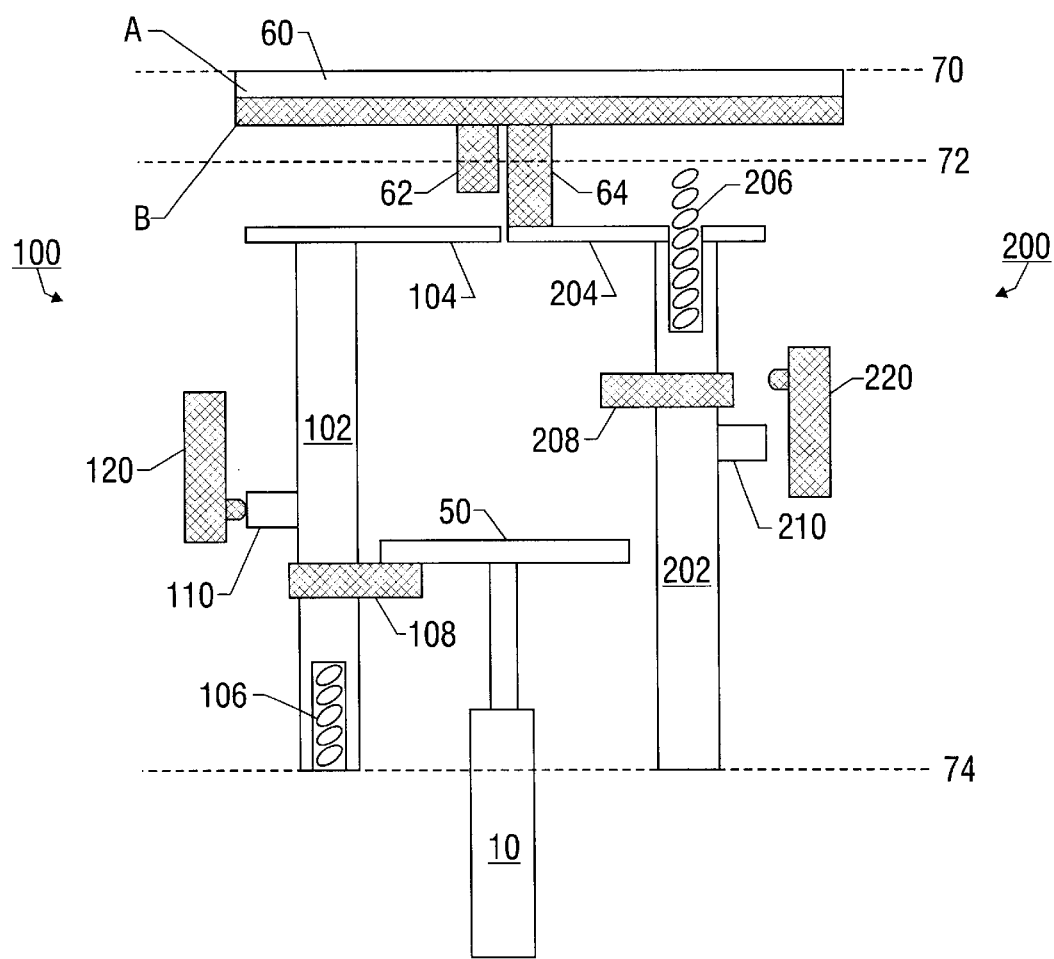
FIGS. 2A–D illustrate an embodiment of an electrical and visual indicator according to the present invention.
Figure 2B:
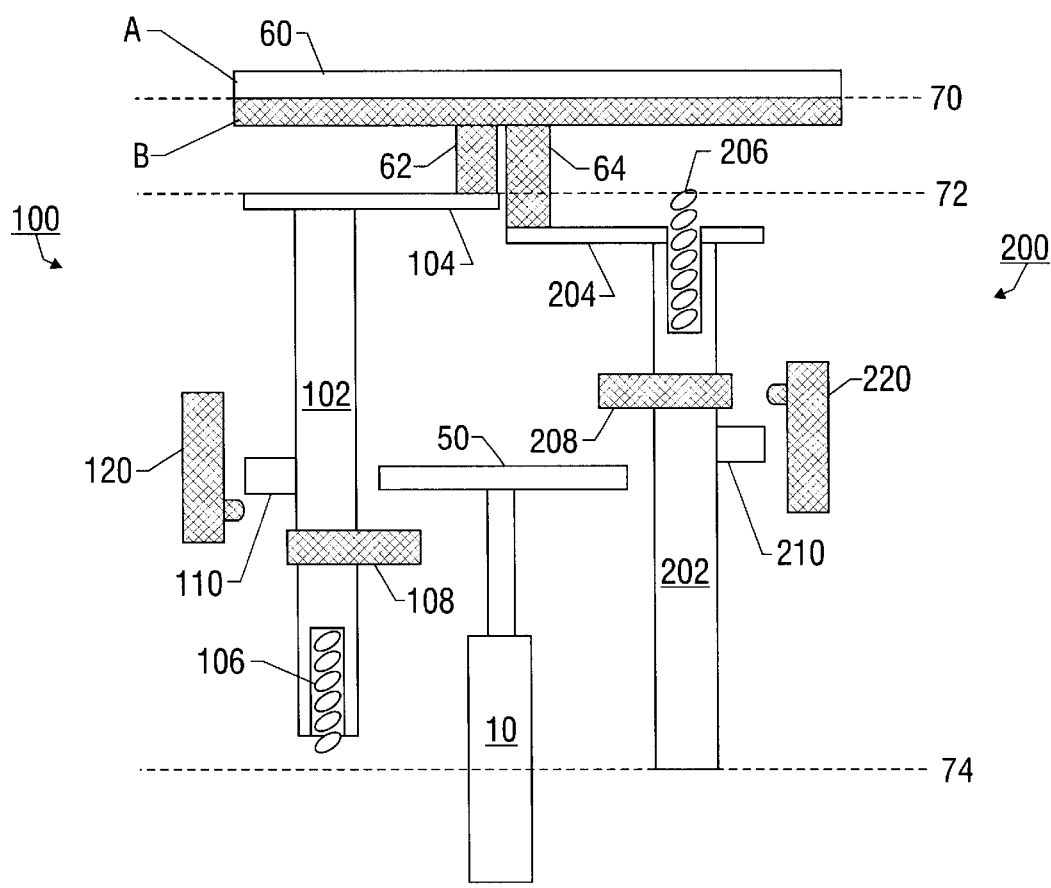
Figure 2C:
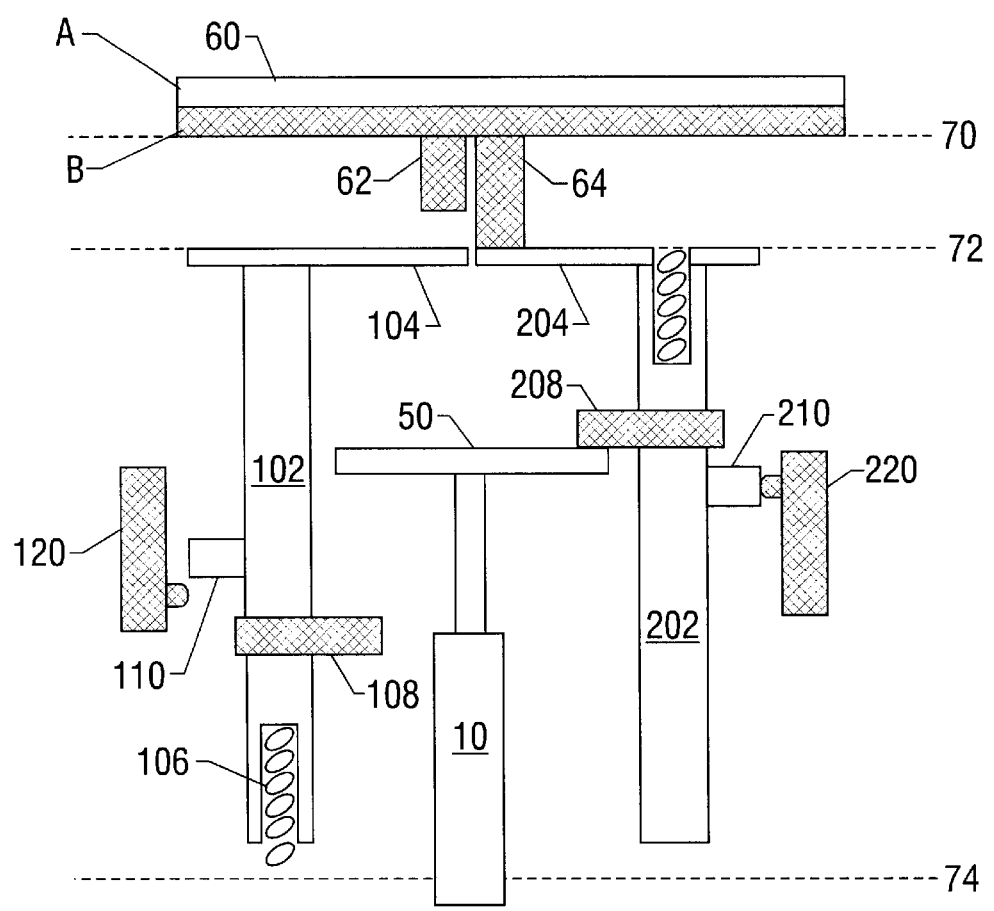

FIGS. 2A–2C schematically illustrate an embodiment of a visual and electrical indicator according to the present invention. In FIG. 2A, a valve stem 10 has an adapter 50 attached. On one side of the adapter 50, there is provided an adjustable trigger system or a closed-valve cam system, generally designated 100. On the other side of the adapter 50 is another adjustable trigger system or an open-valve cam system, generally designated 200. It should be noted that in the foregoing and following descriptions of the invention, a specific vertical orientation is established. For this reason, phrases such as pinnacle, nadir, top, bottom, right, left, under, below, above, etc. are used throughout. It is to be understood that the vertical orientation is provided for the purpose of clarity and ease of description. The present invention may have any orientation depending on its application. For this reason, the phrases used to orient the descriptions of the invention are strictly deemed to be relative terms.

Turning attention to the closed-valve cam system 100, a holder 102 can move longitudinally between a pinnacle 72 and a nadir 74. The holder has a finger 104 at its upper end. At the lower end of the holder 102 is a biasing member or spring 106 within an axial bore of the holder 102. The biasing member 106 discussed in the foregoing and following descriptions provides a force on the holder 102 such as that produced by a spring or other elastic member.

The holder 102 has an adjustable member or adjuster 108 attached. The adjuster 108 is situated below the adapter 50 and is moveable along the holder 102 when calibrating the device to a fully closed-valve position. After initial calibration the adjuster 108 is fixed in the desired location on the holder 102 as it appears in the present FIG. 2A. Also, a switch actuator 110 is located on the holder 102. When the actuator 110 engages a closed-valve switch 120, electrical indication of a closed-valve is made.

Turning attention to the open-valve cam system 200, a holder 202 can also move longitudinally between the pinnacle 72 and nadir 74. The holder 202 has a finger 204 at its upper end. Also at its upper end is a biasing member or spring 206 within an axial bore in the holder 202. The holder 202 has an adjustable member or adjuster 208 attached. The adjuster 208 is situated above the adapter 50 and is moveable along the holder 202 when calibrating the device to an open-valve position. After initial calibration, the adjuster 208 is in a fixed location on the holder as it appears in the present FIG. 2A. Additionally, a switch actuator 210 is fixed to a desired location on the holder 202. When the actuator 210 engages a closed-valve switch 220, electrical indication of an open-valve is made.

Above the holders 102 and 202 is a visual indicator 60 with two visual indication portions or areas A and B. The indication areas A and B may use color and/or inscriptions to visually convey information. It is understood that a variety of means exist in the art for visually differentiating the first and second indication areas apart from one another. For example, the indication area A could be yellow and lack an inscription, while the indication area B could be red and have an inscription or symbol, such as "OPEN". The visual differentiation of the indication areas A, B may involve the use of lights, reflectors, colors, inscriptions, symbols, or other visually differentiating means available to those skilled in the art.

The visual indicator 60 communicates the position of the valve stem 10 by reciprocating between a downward, minimum position when the valve is fully closed and an upward, maximum position when the valve is fully open. The visual indicator 60 has a first contact ridge 62 for contact with closed-valve finger 104, and the indicator 60 has a longer, second contact ridge 64 for contact with open-valve finger 204. In the present FIG. 2A, the second contact ridge 64 contacts the open-valve finger 204.

The adapter 50 is shown in contact with the adjuster 108. Specifically, the adapter 50 causes holder 102 to be held at its longitudinal nadir 74. Consequently, the spring 106 is compressed. In this closed-valve state, the switch actuator 110 engages the closed-valve switch 120 and electrically signals that the valve is closed.

The adapter 50 has no contact in the present position with the adjuster 208 of the open-valve cam 200. As a result, the spring 206 forces the holder 202 to its longitudinal nadir 74. The visual indicator 60, which contacts the finger 204 with the second contact ridge 64, is thereby held below a visual threshold 70 by spring force or gravity. Any portion of the indicator 60 above the visual threshold 70 is visible to a viewer, while any portion below the threshold 70 cannot be seen. In this way, the present embodiment shows no portion of the visual indicator 60 above the visual threshold 70 indicating that the valve is fully closed.

Referring to FIG. 2B, the present embodiment is shown in an intermediate or partially open state. The valve stem 10 displaces the adapter 50 upward as the valve opens. Unhindered by counter-forces, the spring 106 forces the holder 102 upward to the pinnacle 72, and the switch actuator 110 loses contact with the closed-valve switch 120. Electrical indication of a closed-valve is thereby terminated.

The holder 102, being forced to its longitudinal pinnacle 72, causes the finger 104 to contact the first contact ridge 62 of the visual indicator 60. The force of the spring 106 causes the indicator 60 to be lifted. The indicator 60 reveals a first indication area A above the visual threshold 70. The indication area A indicates that the valve is in an intermediate or partially open state. The condition of the open-valve cam system 200 is unaltered by the position of the valve stem 10, and the adapter 50 in an intermediate position as shown in the FIG. 2B. The spring 206 still maintains the holder 210 at its longitudinal nadir 74.

As described above, there is lost motion between the valve stem 10 and the cam systems 100, 200. Specifically, the valve stem 10 and the adapter 50 may move, while the cam systems 100, 200 remain stationary. Due to the lost motion, the longitudinal movement of the holders 102, 202 can be kept to a fixed range, irrespective of variations in the stroke of the valve stem 10 among different valves. Furthermore, the movement of the visual indicator 60 also is kept to a fixed range. Hence, the same assembly, with its visual and electrical position indication can be used on valves with valve stems having different stroke lengths.

Referring to FIG. 2C, the present embodiment is shown in a fully open-valve position. As the valve opens, the valve stem 10 moves the adapter 50 further upward. The spring 206 is compressed as the extending adapter 50 engages the adjuster 208 and forces the holder 202 upward to the pinnacle 72. With the movement of the holder 202, the switch actuator 210 contacts the open-valve switch 220, and electrical indication of a fully open-valve is made.

The holder 202, being forced to its longitudinal pinnacle 72, causes the finger 204 to contact the second contact ridge 64 of the visual indicator 60. The force of valve stem 10 and adapter 50 causes the indicator 60 to be lifted. The indicator 60 thereby reveals the indication area B above visual threshold 70. The indication area B may have an inscription or symbol to provide visual information that the valve is fully open, or the indication areas A and B may involve contrasting colors that indicate a fully open-valve.

The condition of the closed-valve cam 100 is primarily unchanged by the position of the valve stem 10 and adapter 50 in the closed position as shown in the FIG. 2C. The spring 106 still maintains the holder 102 at its longitudinal pinnacle 72. The present embodiment provides both visual and electrical indication for a valve. Moreover, since the positions of the adjusters 108 and 208 can be changed along the holders 102 and 202, the present embodiment can provide visual and electrical indication for valves having valve stems with various stroke lengths.

Figure 2D:
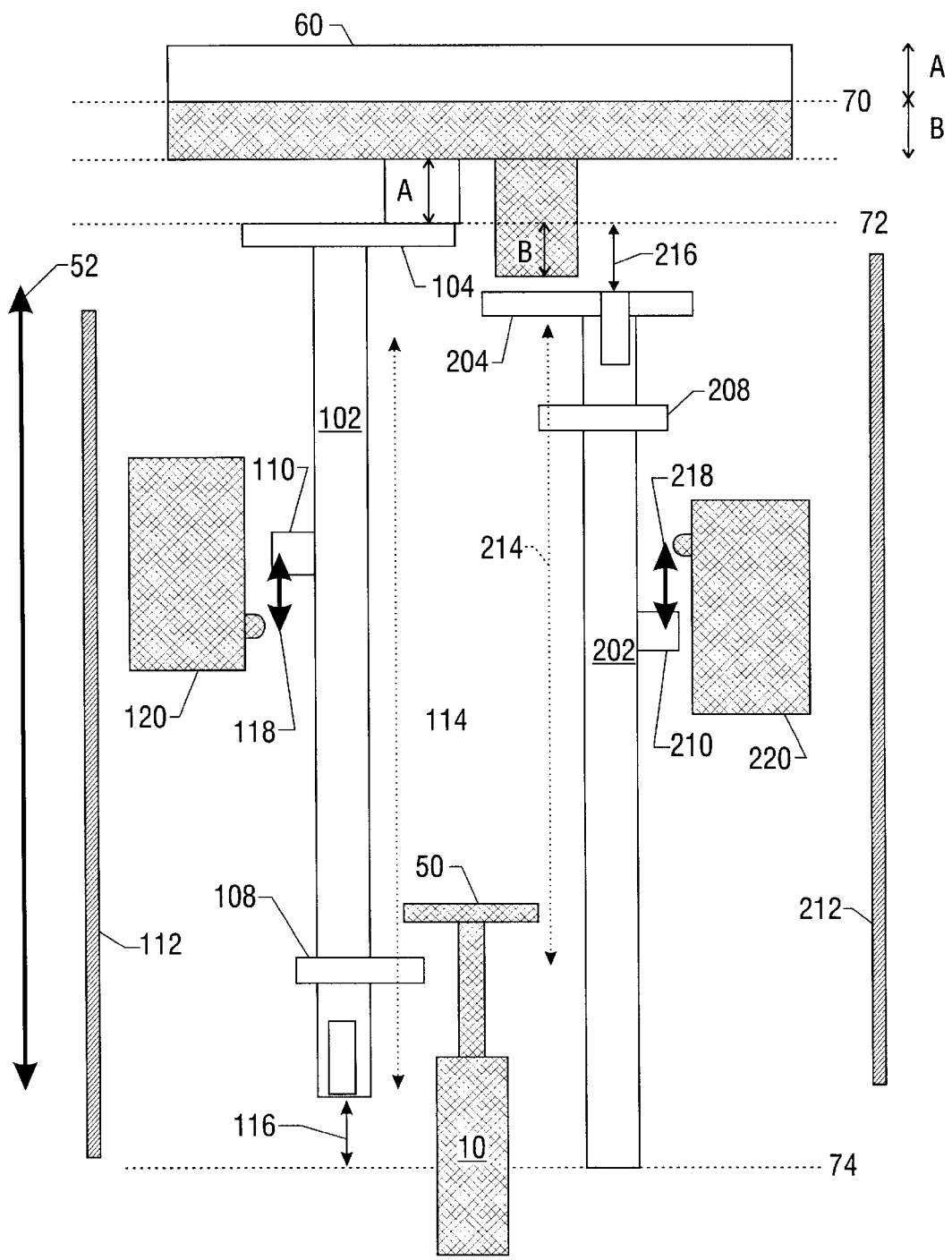

FIG. 2D helps illustrate the principle of the present invention where a visual indicator 60, having a specific display length, can be used with an electrical indicator for valves having various stroke lengths.

A valve stem 10 has an adapter 50 attached. The valve stem 10 has a possible stroke length of 52. The apparatus for monitoring the valve lift has two cam systems 100 and 200. Both cam systems 100, 200 have adjusters, 108 and 208, which engage the adapter 50 on the valve stem 10. Each cam system 100, 200 has an actuator 110 and 210, which activate two limit switches 120 and 220, respectively. The switches 120, 220 act as electrical position sensors for the up and down positions of the valve stem 10.

The present arrangement allows for the adjuster 108 to be moved along the cam system 100 in order to engage the adapter 50 for a closed-valve setting. A line 114 indicates the adjustment range for the adjuster 108. Likewise, the adjuster 208 can be moved along the cam system 200 in order to engage the adapter 50 for an open-valve setting. A line 214 indicates the adjustment range for the adjuster 208. A shaded area 112 displays the trigger area for a closed-valve, and a shaded area 212 displays the trigger area for an open-valve.

Given the stroke length of the valve stem 10 lying within the length 52, the visual indicator 60 is restricted to displaying only specific portions or areas of the indicator 60 during the valve stem positions. This is accomplished by having the cam system 100 movable between the pinnacle 72 and the nadir 74 by an offset amount 116. This offset amount is substantially equal to the offset amount 118 between the actuator 110 and the switch 120. The adjuster 108 is calibrated to engage the adapter 50 and displace the cam system 100 by at least the offset amount 116 to indicate a closed-valve.

In like manner, the cam system 200 is movable between the pinnacle 72 and the nadir 74 by an offset amount 216. This offset amount 216 is substantially equal to an offset amount 218 between the actuator 210 and the switch 220. The adjuster 208 is calibrated to engage the adapter 50 and displace the cam system 200 by at least the offset amount 216 to indicate a closed-valve. Of course, the offset amounts 116 and 216 may be the same but they need not be if the pinnacle 72 and nadir 74 of the two cam systems 100, 200 are at different levels.

The indicator 60 has two display lengths A and B. Display length A corresponds to the displacement of the indicator 60 when the cam system 100 engages its contact ridge. Display length B corresponds to the displacement of the indicator 60 when the cam system 200 engages its contact ridge. To function properly if the cam systems 100, 200 are the same size and move within the same pinnacle 72 and nadir 74, the offset amount 116 must be greater or equal to length A, and the offset amount 216 must be at least length A plus length B.

Various geometrical configurations are possible beyond those presented here. For example, the cam systems 100, 200 may be of differing sizes with different offset amounts 116, 216, thereby producing disparate display lengths A and B. The present discussion of geometrical configurations and lengths is meant to illustrate the principle of lost motion, which provides a specific display length for a visual indicator according to the present invention.

Figure 3A:
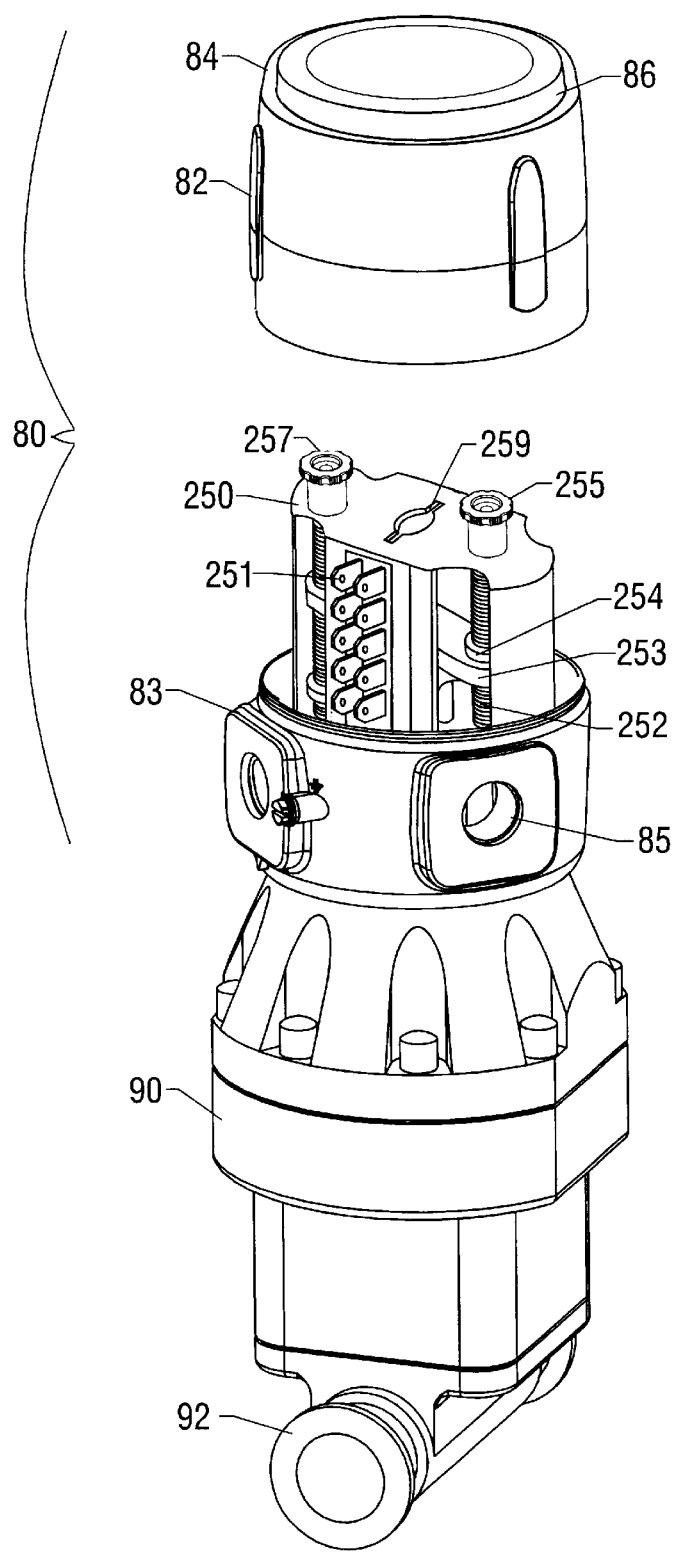
FIG. 3A illustrates an indicator box installed on a valve and pipe.

Referring to FIG. 3A, an isometric view of a linear position indicator according to the present invention is shown installed on a valve. The indicator includes a box 80. At the top of the box is a cover 82, shown removed. At the top of the cover 82 is a clear window 84, through which a visual indicator 86 can be seen. The visual indicator 86 reciprocates like a piston within the cover 82 and window 84 and can be seen through the window 84 during specific states of the valve.

When the visual indicator 86 is at its highest position, two indication areas, such as red and yellow strips or inscriptions, may be visible through the top and sides of the transparent window 84. As the indicator 86 moves slightly downward, the first indication area may move out of view and only the second indication area may remain in view. As the indicator 86 moves still further downward, neither of the indication areas may be seen.

It is further understood that frosting or a lens may be applied to the transparent region on the window 84 to improve reading or differentiating the indication areas on the indicator 86. Also, an opaque band may be applied around the circumference of the cylindrical housing adjacent the top, so that when the valve is fully open, the yellow portion of the indicator 86 is masked from the side.

The box 80 also includes a base 83 having one or more openings 85 for passage of electrical wires and the like (not shown) into and out of the box 80. The wires are for electrical components, such as the open and closed-valve switches (not shown). The base 83 attaches to a valve 90. The valve 90 may be of a pneumatic or hydraulic type for controlling flow through a pipe 92.

A terminal block 250 is disposed within the indicator base 83 and attached thereto. The terminal block 250 provides a set of terminals 251 for the electrical components, such as the switches. The terminal block 250 holds the mechanical apparatus of the open and closed-valve cam systems as described above. A portion of one cam system is visible in the present view.

In the present view, a movable holder (not shown) holds a threaded rod 252. The threaded rod 252 passes through an adapter shoulder 253. On the threaded rod 252 and engaged with the adapter shoulder 253 is a threaded split ring 254. At the top of the terminal block 250 can be seen the adjustment knobs 255 and 257 for the open and closed-valve cam systems. The aperture 259 in the top of the block 250 allows the visual indicator 86 to contact the bifurcate fingers of the holders (not shown).

Figure 3B:
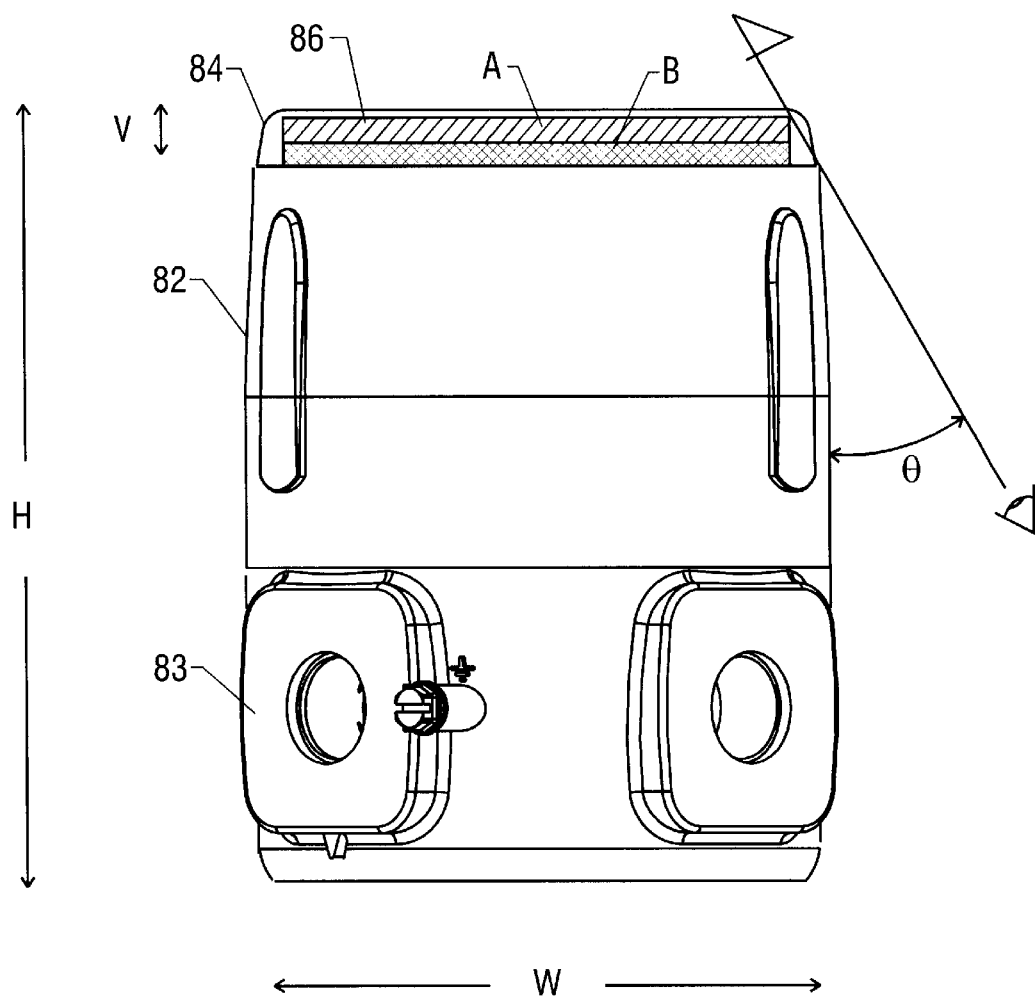
FIGS. 3B–E illustrate details of an indicator according to the present invention.

Referring to FIG. 3B, a side view or the indicator box 80 is illustrated. The indicator box 80 includes a cover 82 and a base 83. At the top of the cover 82 is a clear window 84, through which a visual indicator 86 can be seen. The visual indicator reciprocates like a piston within the cover 82 and window 84 and presently displays two indication areas A and B.

Some exemplary dimensions will help elucidate features of the visual display. The dimensions provided are for illustration purposes only and do not intend to limit the invention in any way. For exemplary valves having a valve stroke length anywhere from 0. 16" to 2.5" (6.3 mm to 65 mm), the height H of the indicator box may be approximately 4.0" (120 mm). The overall width W of the box may be approximately 3.15" (90 mm). The display height V of the indicator 86, which includes the indication areas A and B, may be approximately 0.26" (6.5 mm). With the present dimensions, the visual angle θ, theta, can be close to 30°.

In this way, visual indication of the valve position can be readily viewed from a level substantially below the level of the indicator 86. It is understood that for valves with larger or smaller stroke lengths, the present dimensions may not be applicable. It is also understood that the display height V of the indicator 86 can have a greater or lesser value regardless of the actual stroke length H for a given valve.

Figure 3C:
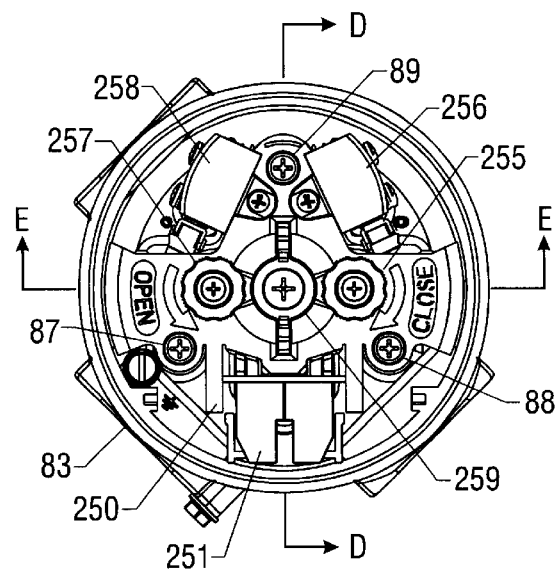

Referring to FIG. 3C, a top view of the position indicator is shown with the window and the visual indicator removed. The terminal block 250 with the terminals 251 is disposed within the base 83. Three attachment bolts 87, 88 and 89 connect the terminal block 250 to the base 83. On the top of the terminal block 250, the adjustment knobs 255 and 257 are situated on either side of the indicator aperture 259. Visible through the aperture 259 is the valve adapter. The open and closed-valve switches 266 and 268 are also situated on either side of the terminal block 250.

Figures 3D, 3E:
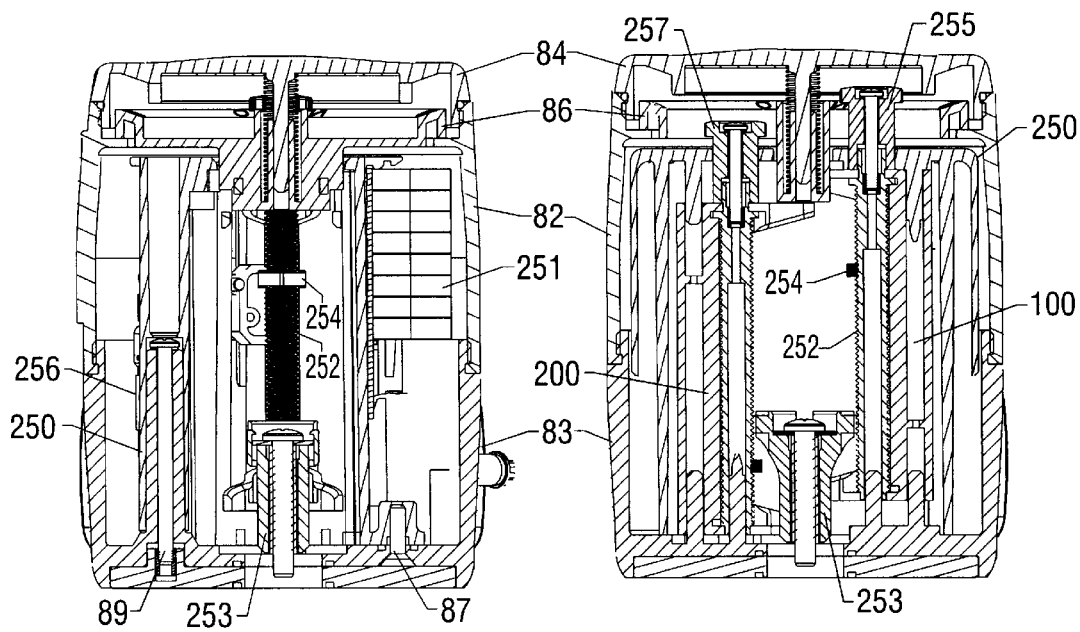

Referring to FIG. 3D, a cross-sectional, side view of the position indicator is illustrated. The cover 82 is threaded onto the base 83, and the window 84 is threaded onto the cover 82. The terminal block 250 is shown attached to the base 83 with the attachment bolts 87 and 89 and disposed within the indicator box. The terminal block 250 has a series of the terminals 251 for the connection of necessary electronics for the controls and switches. The indicator 86 is situated above the terminal block 250 so that it may be revealed through the window 84. The adapter 253 is disposed within the terminal block 250 for movement therein. Shown behind the adapter 253 is a threaded rod 252 with a split ring 254 in contact with the adapter. One limit switch 266 is shown attached to the side of the terminal block 250.

Referring to FIG. 3E, a cross-sectional view of the present embodiment is shown 90 degrees offset from the side view of FIG. 3C. As before, the cover 82 is threaded onto the base 83, and the window 84 is threaded onto the cover 83. The terminal block 250 is shown disposed within the base 83. The indicator 86 is situated above the terminal block 250 so that it may be revealed through the window 84. The adapter 253 is disposed within the terminal block 250 for movement therein. The cam system 100 is shown on one side of the adapter 253, and the cam system 200 is shown on the other.

Figure 4B:
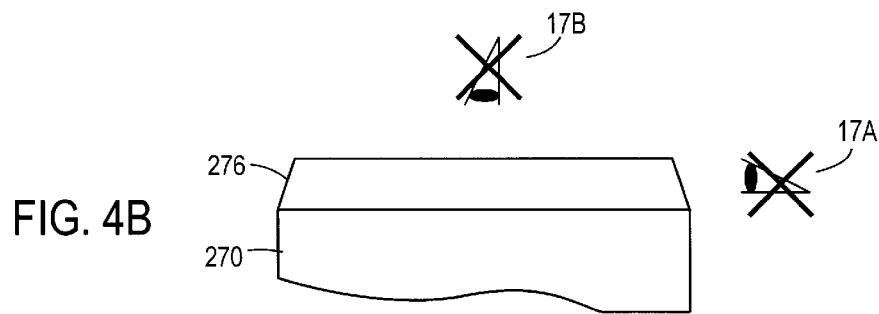
FIGS. 4A–B illustrate an embodiment of the indicator in a closed-valve setting.
Figure 4A:
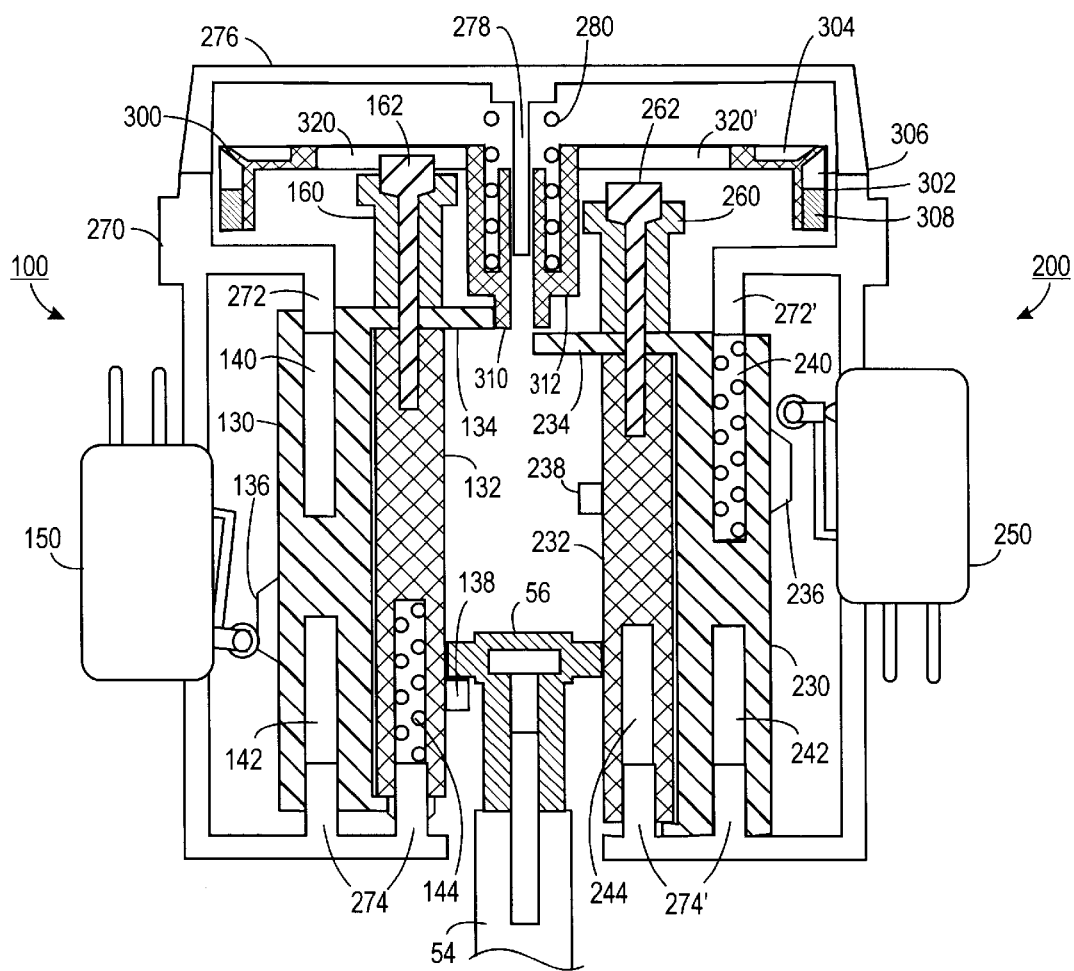

Referring to FIG. 4A, a cross-sectional view of another embodiment of the present invention is illustrated in a closed-valve position. There is provided an indicator box 270. Disposed within the box 270 are two cam systems, a closed-valve system 100 and an open-valve system 200. A valve stem 54 is situated to move longitudinally within the indicator box 270 in closing and opening directions between closed and opened valve positions. The valve stem 54 has an adapter 56 attached. For an exemplary embodiment of an adapter, refer to FIG. 5A below.

Turning attention to the closed cam system 100, a holder 130 can move longitudinally within the indicator box 270 and rides along upper protrusions 272 and lower protrusions 274. The holder 130 has an upper bore 140 wherein the protrusion 272 fits, and a lower bore 142, wherein one of the lower protrusions 274 fits. For an exemplary embodiment of a holder, refer to FIG. 5D below.

Adjacent to the holder 130 and attached to an upper balancer 134 of the holder 130 is a threaded rod 132. The threaded rod 132 has a lower bore with a spring 144 inside. Threaded on the rod 132 is a first threaded split ring 138 that can be moved along the rod 132. The first threaded split ring 138 is situated below the adapter 56. For exemplary embodiments of the threaded rod and split ring, refer to FIGS. 5B and 5C below.

Additionally, the holder 130 has a switch actuator 136 in a fixed location on the side of the holder 130. The actuator 136 engages a closed-valve switch 150 electrically indicating that the valve is closed. The closed-valve switch 150 is attached to the indicator box 270 or terminal body.

Turning attention to the open cam system 200, a holder 230 can move longitudinally within the indicator box 270 and rides along upper protrusion 272' and lower protrusions 274' in the indicator. The holder 230 has an upper bore with a spring 240.

Adjacent to the holder 230 and attached to an upper balancer 234 of the holder is a threaded rod 232. The threaded rod 232 has a lower bore 244. Threaded on the rod 232 is a second threaded split ring 238 that can be moved along the rod. The ring 238 is situated above the adapter 56. Similar to the closed cam system 100, the holder 230 for the open can system 200 has a switch actuator 236 in a fixed location on the side of the holder 230. The actuator 236 is situated to engage an open-valve switch 230 to electrically indicate when the valve is open.

Above the holders 130 and 230 are the adjustment knobs 160 and 260, respectively. The knobs 160, 260 fit onto ends of the threaded rods 132 and 232 that project above the holders 130, 230. The adjustment knobs 160, 260 can be turned in order to rotate their respective threaded rods 132, 232. Rotation of the rods causes the threaded split rings 138, 238 to ride up or down along the rods. Each knob 160, 260 is provided with a lock 162 and 262. For an exemplary embodiment of an adjustment knob, refer to FIG. 5E. Further detail of the properties and function of the adjustment knobs is provided below in FIGS. 6A–E.

Also above the holders 130 and 230 is a visual indicator 300 having a disc shape. The indicator 300 has an indication region 302 with two indication areas 306 and 308. The indication areas 306, 308 may include color strips of contrasting colors, such as yellow and red. Furthermore, one or more of the indication areas may include an inscription or symbol, such as the word "OPEN" or "CLOSED" with which to indicate the state of the valve.

There are two openings 320 and 320' in the visual indicator 300 to accommodate the adjustment knobs 160 and 260. In the center of the indicator 300 is a protrusion extending below the disc in the closing direction. The protrusion has a first contact ridge 312 for contact with the closed cam balancer 134, and a second contact ridge 310 for contact with the open cam balancer 234. For an exemplary embodiment of an indicator, refer to FIG. 5F below.

In the present FIG. 4A, the second contact ridge 310 contacts the open cam balancer 234. The protrusion also has a central bore and rides along a shaft 278 on the clear window 276. There may also be a biasing member or spring 280 disposed around the shaft 278 and within the protrusion. The spring 280 may force the indicator 300 in the closing direction below the visual threshold of the window 276 in the absence of any counter-forces from the indicator mechanism.

The adapter 56 is shown in contact with the threaded split ring 138. Specifically, the adapter 56 causes the holder 130 to be moved in the closing direction and to be held at its longitudinal nadir. Consequently, the spring 144 is compressed. In this closed-valve state, the switch actuator 136 engages the closed-valve switch 150 and electrically signals a closed-valve. The adapter 56 has no contact in the present position with the adjuster 238 of the open cam 200. As a result, the spring 240 forces the holder 230 in the opening direction to its longitudinal nadir. In addition, the visual indicator 300 remains below the visual threshold of the window 276 by force of the spring 280.

Referring to FIG. 4B, a detail of FIG. 4A shows the resulting view of the cover 270 with attached the window 276 from outside. The visual indicator 300 is not visible above the threshold of the window 276 by a viewer 17A, nor is the top of the indicator visible to a viewer 17B.

Figure 4D:
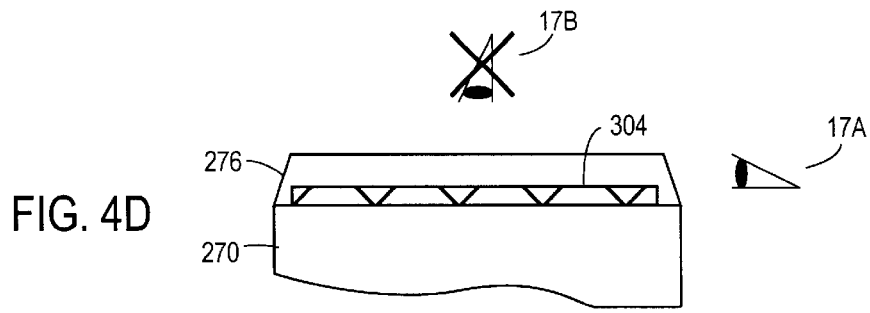
FIGS. 4C–D illustrate the embodiment of the indicator in an intermediate-valve setting.
Figure 4C:
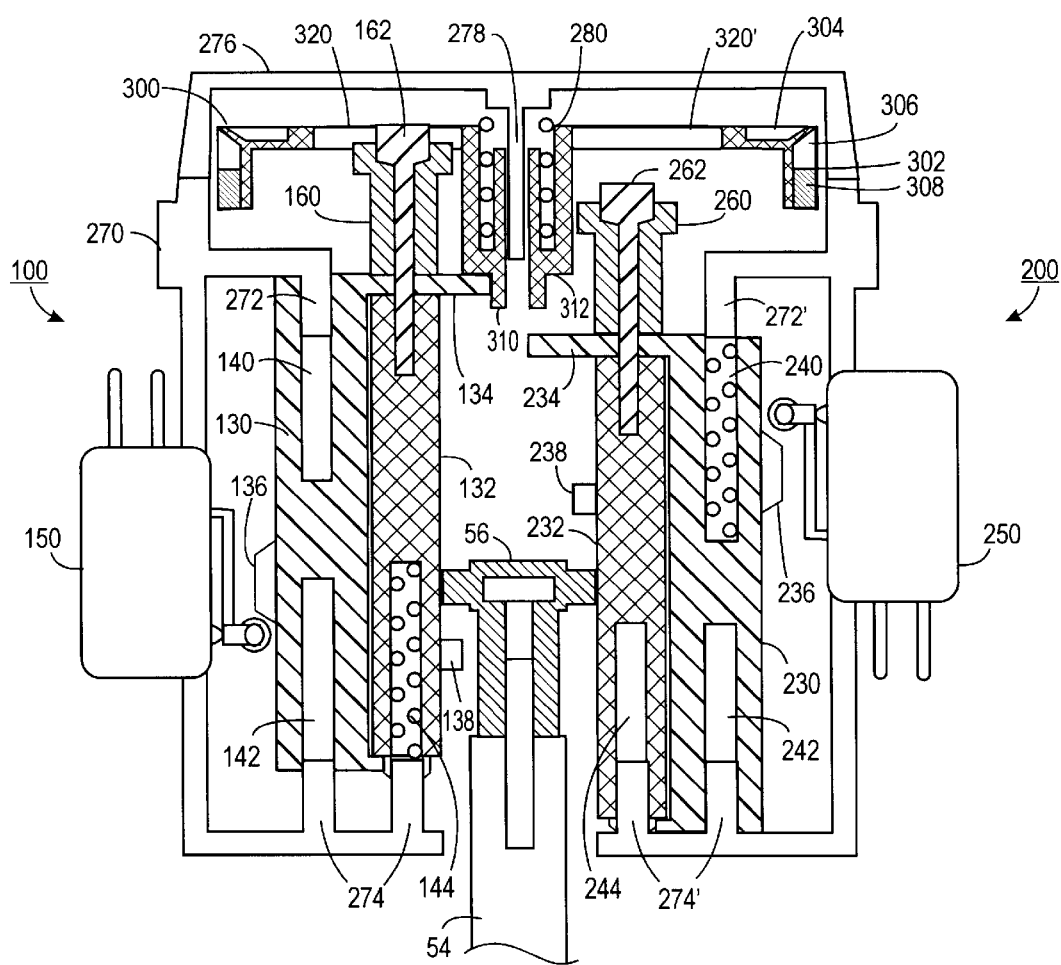

Referring to FIG. 4C, the present embodiment is shown in an intermediate or partially open state of the valve. The valve stem 54 has displaced the adapter 56 upward. Contact with the closed-valve adjuster 138 is lost. The spring 144 forces the holder 130 upward in the opening direction to its pinnacle position. With the movement of the holder 130, the switch actuator 136 loses contact with the closed-valve switch 150, and electrical indication of a closed-valve is terminated.

The holder 130 being forced to its longitudinal pinnacle causes the finger 134 to contact the first contact ridge 312 of visual indicator 300. The spring 144 forces the indicator 300 to be lifted in the opening direction. The indicator 300 reveals the first indication area 306 on the indicator 300 above visual threshold of the cover 270. The condition of the open cam system 200 is unaltered by the position of the valve stem 54 and adapter 56 in an intermediate position as shown in the FIG. 4C. The spring 240 still maintains the holder 230 at its longitudinal nadir.

As the open and closed cam systems 100 and 200 move upwardly and downwardly, the visual indicator 300 moves with them inside the housing 270. The disc-like head of the indicator 300 has a top face 304 that may be of one solid color, such as red. The indication area 306 may be a concentric narrow band of another color, such as yellow, and may encircle the edge of the indication region 302 around the circumference of the indicator 300. Beneath the indication area 306 is the other indication area 308. The indication area 308 may be another band of the same color as the top face of the indicator, i.e. red and/or may include an inscription or symbol.

The visibility of the top face 304 and the side indication areas 306, 308 is depicted in FIG. 4D. The indication area 306 circumscribing the edge of the indication region 302 around the indicator 300 is visible from the side by the viewer 17A. Due to frosting of the top of the window 276 or other means to hinder visibility of the top of the indicator 300 when it is too far removed from the surface of the window 276, the top face 304 may not be clearly visible through the window 276 by the viewer 17B.

Figure 4F:
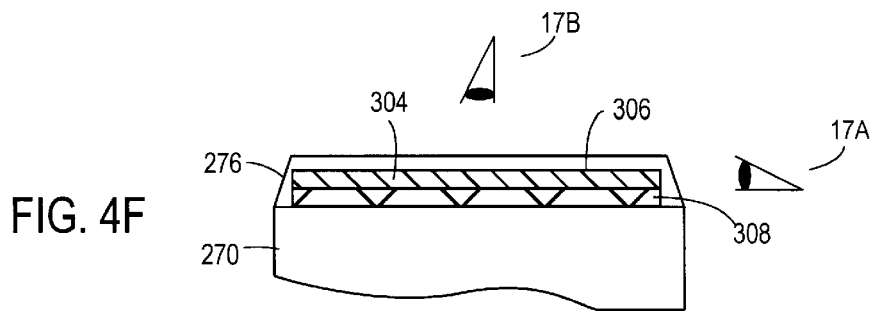
FIGS. 4E–F illustrate the embodiment of the indicator in an open-valve setting.
Figure 4E:
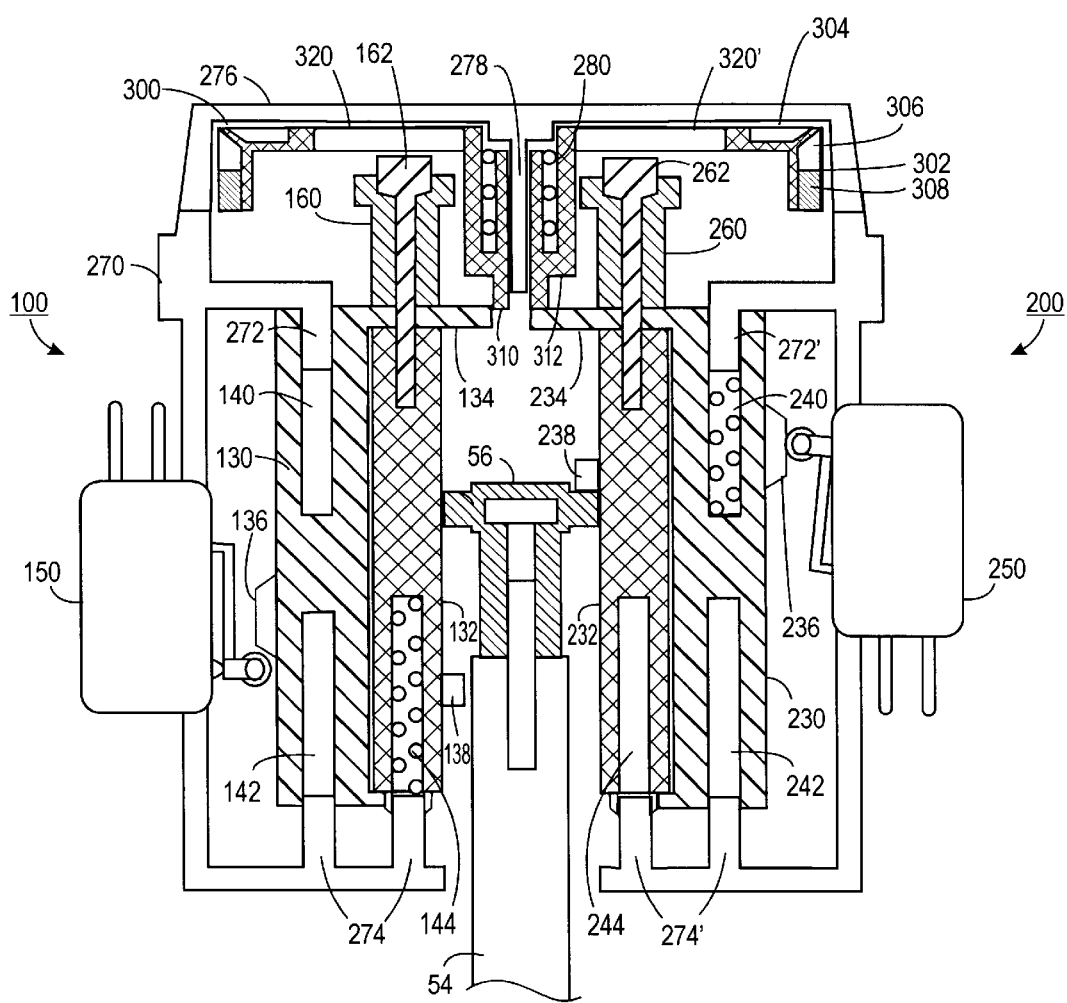

Referring to FIG. 4E, the present embodiment is shown in a fully open-valve position. The valve stem 54 has extended the adapter 56 further upward in the opening direction. The spring 240 is compressed, as the extending adapter 56 engages the adjuster 238 and forces the holder 230 upward in the opening direction to its pinnacle. With the movement of the holder 230, the switch actuator 236 contacts open-valve switch 250, and electrical indication of an open-valve is made.

The holder 230, being forced to its longitudinal pinnacle, causes the finger 234 to contact the second contact ridge 310 of the visual indicator 300. The force of valve stem 54 and adapter 56 causes the indicator 300 to be lifted further. The indicator 300 reveals the indication area 308 on the indicator through the window 276. The condition of the closed cam system 100 is primarily unchanged by the position of the valve stem 54 and adapter 56 in a closed-valve position as shown in the FIG. 4E. The spring 144 still maintains the holder 130 at its longitudinal pinnacle.

The two revealed indication areas 306 and 308 indicate an open-valve. The visibility of the top 304 and side indication areas 306 and 308 is depicted in FIG. 4F. The indication area 306 circumscribing the edge of the indication region 302 around the indicator 300 is revealed through the window 276, as is the indication area 308. The top face 304 of the indicator 300 is now visible through the window 276 by becoming adjacent to the frosted top of the window 276. Thus, visual indication 300 of an open-valve is visible to a viewer on the side 17A and the top 17B of the indicator 300.

Referring to FIG. 5A, an exemplary embodiment of an adapter 330 is illustrated according to the present invention. The adapter 330 has a shaft portion 332 where it attaches to the valve stem (not shown). Two shoulders 334 and 336 are situated perpendicular to the shaft portion 332. The shoulder 334 has a hole 335 for insertion of a threaded rod (not shown) therein. The shoulder 336 has a hole 337 for insertion of another threaded rod (not shown) therein. The adapter 330 also has a central bore 338 for insertion of a bolt to attach the adapter 330 to the valve stem. The shoulders 334, 336 need not include an open hole such as 335 and 337, although a forked end or simple lip on the end of the shoulders is sufficient for engagement with a ring on a threaded rod.

Referring to FIG. 5B, an exemplary embodiment of a threaded split ring is illustrated according to the present invention. The ring 340 has a split 344 through its circumference. The split runs along a central, threaded bore 342 of the ring. The split ring 340 threads onto a threaded rod as shown in an exemplary embodiment of FIG. 5C.

A threaded rod 350 in FIG. 5C has a shaft 352 on which a split ring, as in FIG. 5B, threads. The shaft 352 has an upper head 354 with a key slot 355 and a central bore 356. The key slot 355 and central bore 356 are for use with an adjuster knob and lock detailed below. The shaft 352 also includes a lower head 358. The shaft 352 with a threaded split ring (not shown) installs in one of the shoulder holes of an adapter in FIG. 5A.

An exemplary embodiment of a holder 360 is depicted in FIG. 5D. The holder 360 includes a shaft section 361 to which a threaded rod (not shown) is situated in parallel. The shaft section 361 of the holder 360 has upper and lower bores 362 and 362' on which to ride longitudinally. The holder 360 also includes an upper balancer 366 with a snap opening 363 for connection to an upper head of the threaded rod. Similarly, the holder 360 has a lower balancer 366' with a snap opening 363' for connection to the lower head of the threaded rod.

Along the inside surface of the shaft section 361 lies a longitudinal track 364. When the threaded rod is connected to the holder 360, the longitudinal track 364 inserts into the split in the threaded ring as best seen in FIG. 5B. Thus, the threaded split ring rides up and down the rod along the longitudinal track 364 as the threaded rod is turned. Also, a switch actuator 365 projects from the shaft section 361 of the holder.

An exemplary adjustment knob 380 is shown in FIG. 5E. The adjustment knob attaches to the upper end of a threaded rod (not shown) that extends above a holder (not shown). The adjustment knob has a head 382 to facilitate turning of the knob and a key 386 to fit into a key slot of the threaded rod. Therefore, turning the adjustment knob 380 rotates the threaded rod within the holder And causes a threaded ring (not shown) to move up or down along a longitudinal track of the holder. By this means, the position for contact between an adapter shoulder (not shown) and the split ring can be changed along the threaded rod.

The adjustment knob 380 also includes a central bore 386 that aligns with a central bore on the threaded rod. Through these bores, a lock (not shown) may install to prevent the rotation of the threaded rod and to maintain a particular position of the threaded ring on the rod.

Referring to FIG. 5F, an exemplary embodiment of a visual indicator 390 is illustrated according to the present invention. The indicator is disc-shaped and includes a lip 392, having an indication area. The indication area may include the use of colors, inscriptions, or symbols to provide the necessary visual indication of the states of the valve. In the present embodiment, the indication area on the lip 392 includes the inscription "OPEN" to indicate an open valve state. The disc portion has a left and right hole 393 and 393' to accommodate adjustment knobs (not shown) as described above in FIG. 5G. The top of the disc portion has a top indication area C not visible in the present view. The top indication area C outlines the circumference of the top of the disc. The indication area C is visible through a window of an indicator box (not shown), when the indicator reciprocates sufficiently close to the surface of the window. The indication area C may be the same color as provided with indication area B and/or may have an inscription, such as "OPEN".

Centrally located on the disc, a protrusion 394 extends below the plane of the disc portion. The protrusion has a central bore 395 with which the indicator 390 can move vertically on a shaft (not shown). On both sides of the protrusion are contact ridges 396 and 397. The first contact ridges 396 and 396' extend to the full depth of the protrusion 394 and contact the bifurcate fingers of a balancer as described above.

The second contact ridges 397 and 397' extend to a lesser depth along the protrusion 394 and are situated at a further radius from the protrusion than that of the first contact ridges 396, 396'. These second ridges 397, 397' contact the bifurcate fingers of a balancer as described above.

Figure 6A:
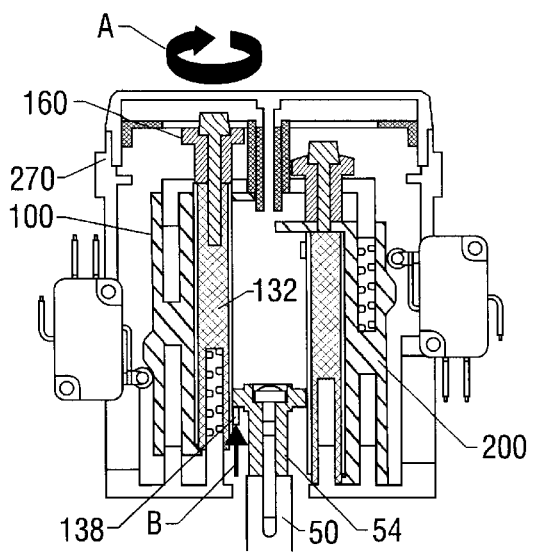
FIGS. 6A–E illustrate adjustment of the embodiment of the indicator for valves having various stoke lengths.

To illustrate the adjustment of an embodiment of a valve position indicator according to the present invention, a series of FIGS. 6A–E are presented. In FIG. 6A, an indicator box 270 with cams 100 and 200 has been properly installed on the valve, and an adapter 54 has been attached to the valve stem 50. With the valve in a fully closed position and the valve stem 50 at its nadir, a closed-valve adjustment knob 160 is unlocked. The adjustment knob 160 is turned (Arrow A) so that a threaded shaft 132 rotates. A threaded split ring 138 rides along a longitudinal track and up the rotating rod (Arrow B). The ring 138 engages a shoulder of the adapter 52.

Figure 6B:
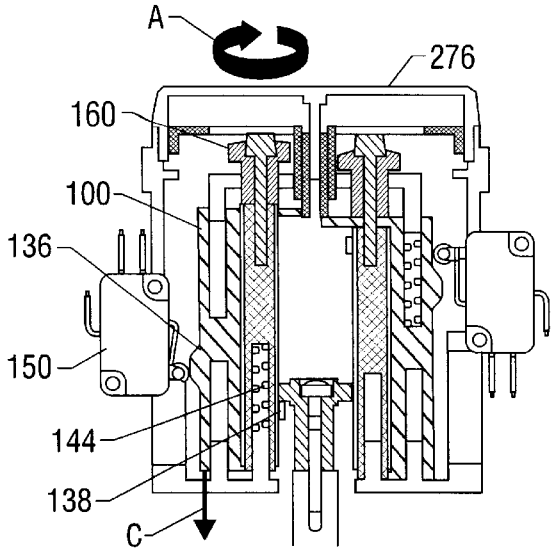

In FIG. 6B, while the ring 138 is engaged with the adapter 52, rotation of the adjustment knob 160 continues (Arrow A). The closed-valve cam system 100 moves down (Arrow C) and compresses a spring 144. The adjustment knob 160 is turned until an actuator 136 engages and activates the closed-valve switch 150. The engagement of the closed-valve switch 150 also corresponds to the point where the visual indicator 300 lies below the visible level of the window 276, which indicates a closed-valve.

Figure 6C:
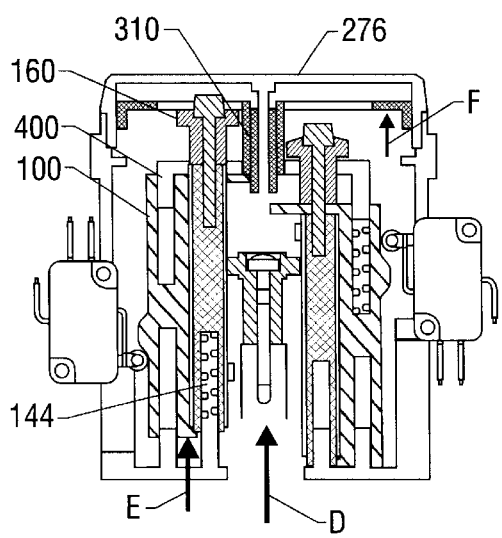

In FIG. 6C, the closed-valve adjustment knob 160 is locked to prevent the threaded rod 132 from rotating and to maintain the position of the threaded split ring 138 on the rod. The valve is then piloted, and the valve stem 50 moves upward (Arrow D). The closed-valve cam system 100 moves upward, as the spring 144 expands (Arrow E). The upper partition of the terminal block 400 stops the upward movement of the cam system 100. Towards its pinnacle, the closed-valve cam system 100 engages the first contact ridge 312 of the visual indicator 300 and forces the indicator upward (Arrow F). Consequently, the indication area 306 on the visual indicator 300 is revealed through window 276.

Figure 6D:
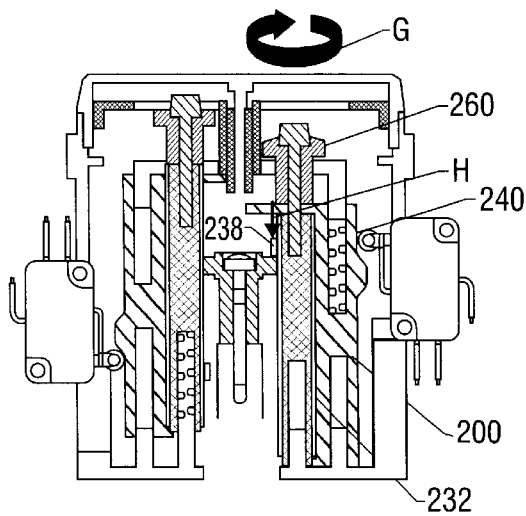

As depicted in FIG. 6D, once the valve has been piloted to its fully open position and the valve stem 50 has reached its pinnacle, the adjustment knob 260 for the open-valve system is unlocked. The adjustment knob 260 is turned (Arrow G), causing a threaded split ring 238 to move down a threaded rod 232. The split ring 238 then engages the adapter 52.

Figure 6E:
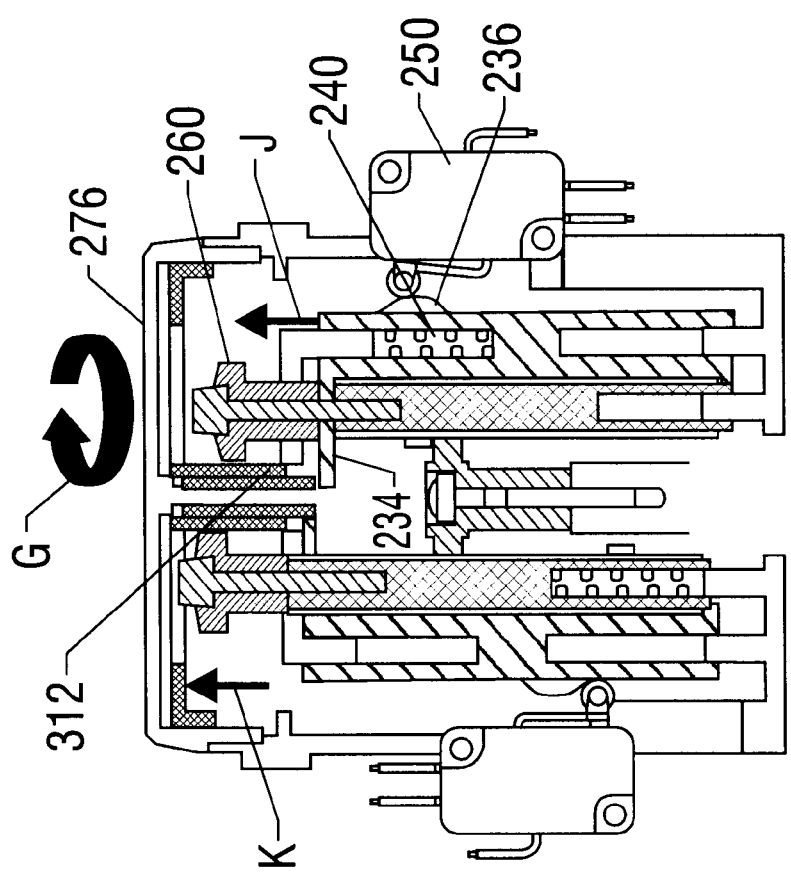

With continued turning of the adjustment knob 260, the open-valve cam system 200 is forced upward (Arrow H) as depicted in FIG. 6E. The spring 220 is compressed, and the bifurcate fingers on a balancer 234 engage a second contact ridge 312 of the visual indicator 300. The adjustment knob 260 is turned and the cam system 200 moved until the actuator 236 engages and activates the open-valve switch 250.

At this point the visual indicator 300 fully reveals the indication area 308 through the window 276. Also, the top face 304 of the indicator 300 is revealed through the top of the window 276. The adjustment knob 260 is then locked to prevent alteration of the setting. Thus, the position indicator 300 is set for the specific stroke length for the given valve.

Referring to FIG. 7, another embodiment of the present invention is illustrated. Attached to a valve stem 410 is an adapter 420. The valve stem 410 and adapter 412 are shown in an intermediate or partially open position of the valve in the present FIG. 7. In contrast to previous embodiments wherein the first and second cam systems were separate from one another, the apparatus in the present embodiment includes the first and second cam systems being integral to one another. First, to indicate a closed-valve state, the adapter 412 contacts an adjuster 422 when the valve is closing. The adjuster 422 is moveable along a holder 420 when calibrating the device to indicate a closed-valve position. After the initial calibration, the adjuster 422 is in a fixed location of the holder 420 as it appears in the present FIG. 7. With the adapter 412 engaging the adjuster 422, holder 420 is forced down to its nadir 454. A spring 424 is compressed, and a fixed actuator 426 contacts a switch 428 to electrically indicate a fully closed-valve.

In the intermediate state shown in the FIG. 7, the adapter 412 has lost contact with the adjuster 422. The spring 424 expands and forces the holder 420 upward. The longitudinal movement of the holder 420 in the opening direction is limited by the spring 424 reaching equilibrium position or by the counter-force of an upper spring 432. Therefore, the holder 420 makes only an upward step. With this upward step of the holder 420, the actuator 426 loses engagement with the switch 428. Also as a result of the upward movement of the holder 420, the finger 438 in contact with the contact ridge 446 of the indicator 440 forces the indicator upward. A first indication area 442 on the indicator 440 is revealed above the visual threshold 450. The first indication area 442 indicates the intermediate or partially open state of the valve between fully open and fully closed states.

With further opening of the valve, the adapter 412 is brought into engagement with the adjuster 430. The adjuster 430 is moveable along the holder 420 when calibrating the device to indicate a fully open-valve position. After the initial calibration, the adjuster 430 is in a fixed location on the holder 420 as it appears in the present FIG. 7. The valve stem 410 and adapter 412 then force the holder 420 upward in the opening direction to its pinnacle 452 where the upward movement is halted. With the upward step of the holder 420, the actuator 434 engages and actuates an open-valve switch 436 to electronically indicate an open-valve. The spring 432 is compressed, while the spring 424 is extended. The finger 438 also steps upward with the holder 420 and pushes the indicator 440 up as well. The indicator 440 then reveals a second indication area 444 to indicate a fully open-valve.

For the present embodiment, initial calibration of the adjusters 422, 430 may require steps other than those explicitly detailed for the embodiment in FIGS. 6A–E. Because the adjusters 422, 430 are on the same holder 420, the use of threaded rings for the adjuster 422 and 430, as described earlier, would require some modification of the steps to adjust the device for valves with different stroke lengths. For example, an operator may manually adjust the threaded rings along a rod in order to calibrate the indicator for a specific valve.

FIGS. 8–9 illustrate exemplary embodiments for adjusters and holders in accordance with the principle in the embodiment of FIG. 7.

Referring to FIG. 8, a holder 462 with an adjacent, threaded rod 464 is connected to lower and upper balancers 474 and 476. The holder 462 has two actuators 470 and 471 for engaging limit switches (not shown) to electrically indicate the closed and open-valve positions, respectively. The holder 462 also has an upper and lower spring 472 and 473.

The threaded rod 464 has a lower adjuster 466 threaded below an adapter 460. A locking nut 467 is threaded below lower the adjuster 466. The adjuster 466 and locking nut 467 are tightened together so as to prevent their movement along the threaded rod 464. The threaded rod also has an upper adjuster 468 threaded above the adapter 460. A locking nut 469 is shown not tightened to the adjuster 468.

In the present embodiment, the calibration of the adjusters 466 and 468 may be performed manually by an operator. The adjusters 466, 468 may be directly turned by hand to the appropriate position on the rod 464 corresponding to the upper and lower extremities of the reciprocating movement of valve stem (not shown) and adapter 460. For example, once the valve is piloted to the fully open position, the upper adjuster 468 may be threaded down the rod 464 until contact is made with the adapter 460. Then, the locking nut 469 may be tightened against the adjuster 468 to prevent movement along the rod 464.

Referring to FIG. 9, a holder 480 with two, adjacent threaded rods 482 and 484 is connected to lower and upper balancers 496 and 496'. The holder 480 has two actuators 498 and 500 for engaging limit switches (not shown) to electrically indicate the closed and open-valve positions, respectively. The holder 480 also has an upper and lower spring 502 and 504.

The first threaded rod 482 is adjacent to the second threaded rod 484. Below the adapter 478, the lower adjuster 486 is threaded onto the first threaded rod 482 through a threaded bore 488. The second threaded rod 484 passes through a smooth bore 490 in the lower adjuster 486. In this arrangement, an adjustment knob 506 rotates the first threaded rod 482. The lower adjuster 486 can then move longitudinally up or down as the threaded bore 488 rides along the thread of the first rod 482. The smooth bore 490 rides freely along the second rod 484.

Similarly, above the adapter 478, the upper adjuster 492 is threaded onto the second threaded rod 484 through a threaded bore 495, and the first rod 482 passes through a smooth bore 494. An adjustment knob 508 can be turned to rotate the second threaded rod 484. The upper adjuster 492 can then be moved to an appropriate position for indicating a fully open-valve.

To prevent damage to the threaded rods 482, 484 by the smooth bores 490, 494 running up and down the threads during calibration, the rods 482, 484 may be provided with upper and lower portions. One portion may be threaded and the other smooth, depending on the arrangement of bores through which they must pass. Otherwise, the smooth bores 490, 494 may be easily fitted with a cylindrical bearing made of nylon or provided with some other means that prevents the material of the smooth adjuster bore 490, 494 from directly contacting the threads of the rods 482, 484.

The present invention allows a single adjustable visual and electrical sensor to be used with valves having different stroke lengths. For various valves, the distance that the valve member reciprocates can vary from one valve to another. The present invention can be adjusted so that its movement remains within fixed limits. Therefore, the present invention controls a single visual indicator and electrical switches for determining the state of valves with different stroke lengths.

While the invention has been described with reference to the preferred embodiments, obvious modifications and alterations are possible by those skilled in the related art. Therefore, it is intended that the invention include all such modifications and alterations to the full extent that they come within the scope of the following claims or the equivalents thereof.

What is claimed is:

1. An apparatus for indicating a state of a valve, the valve having a stem being movable in closing and opening directions between closed and open valve positions, the apparatus comprising:
    a first cam system being biased in the opening direction, the first cam system capable of adjustably engaging the stem when the stem is adjacent to the closed valve position and being movable by the stem in the closing direction once engaged, and
    a second cam system being integral to or separate from the first cam system and being biased in the closing direction, the second cam system capable of adjustably engaging the stem when the stem is adjacent to the open valve position and being movable by the stem in the opening direction once engaged, and
    an indicator moveable by the first and the second cam systems and capable of indicating at least open, intermediate, and closed states of the valve.

2. The apparatus of claim 1, wherein each cam system comprises:
    a holder biased by a spring and capable of moving the indicator,
    a rod on the holder, and
    a member being adjustable on the rod.

3. The apparatus of claim 2, wherein the adjustable member is a ring being threaded on the rod and defining a split, the split fitting into a track on the holder.

4. The apparatus of claim 2, wherein the stem has an adapter to engage the adjustable member.

5. The apparatus of claim 1, wherein the indicator is biased in the closing direction.

6. The apparatus of claim 1, wherein the indicator indicates the intermediate state in the absence of engagement of the stem with the first and second cam systems.

7. The apparatus of claim 1, wherein the indicator comprises first and second visual portions, the indicator indicating neither portion for the closed valve state, indicating only one portion for the intermediate valve state, and indicating both portions for the open valve state.

8. The apparatus of claim 1, wherein the indicator comprises:
    a first member capable of engaging the first cam system when moved by the first biasing member in the opening direction, and
    a second member being further disposed in the closing direction than the first member and capable of engaging the second cam system when moved by the stem in the opening direction.

9. The apparatus of claim 1, further comprising
    a first switch capable of being actuated by the first cam system when the stem is at the closed valve position; and
    a second switch capable of being actuated by the second cam system when the stem is at the open position.

10. The apparatus of 9, wherein the first and second switches electrically indicate the open, intermediate, and closed states of the valve.

11. An apparatus for visually and electronically indicating a state of a valve, the valve having a stem being movable in closing and opening directions between closed and open valve positions, the apparatus comprising:
    a first cam system comprising:
        a first adjustable member engaging the stem when the stem is adjacent to the closed valve position, the first cam system being movable by the stem in a closing direction once engaged, and
        a first biasing member forcing the first cam system in the opening direction;
    a first switch capable of being actuated by the first cam system when the stem is at the closed valve position;
    a second cam system being integral to or separate from the first cam system and comprising:
        a second adjustable member engaging the stem when the stem is adjacent to the open valve position, the second cam system being movable by the stem in the opening direction once engaged, and
        a second biasing member forcing the second cam system in the closing direction;
    a second switch capable of being actuated by the second cam system when the stem is at the valve open position; and
    an indicator moveable by the first and the second cam systems and capable of indicating at least open, intermediate, and closed states of the valve.

12. The apparatus of claim 11, wherein the stem has an adapter to engage the first and second adjustable members.

13. The apparatus of claim 11, wherein each cam system comprises:
   a holder biased by a spring and capable of moving the indicator,
   a threaded rod on the holder, and
   a ring adjustably threaded on the rod.

14. The apparatus of claim 13, wherein the ring defines a split fitting into a track on the holder, the ring being adjustable by rotation of the rod.

15. The apparatus of claim 11, wherein the indicator is biased in the closing direction.

16. The apparatus of claim 11, wherein the indicator indicates the intermediate state in the absence of engagement of the stem with the first and second cam systems.

17. The apparatus of claim 11, wherein the indicator comprises first and second visual portions, the indicator indicating neither portion for the closed valve state, indicating only one portion for the intermediate valve state, and indicating both portions for the open valve state.

18. The apparatus of claim 11, wherein the indicator comprises:
   a first member capable of engaging the first cam system when moved by the first biasing member in the opening direction, and
   a second member being further disposed in the closing direction than the first member and capable of engaging the second cam system when moved by the stem in the opening direction.

19. A method for indicating states of a valve having a stem, the stem being movable in closing and opening directions between closed and open valve positions, the method comprising the steps of:
   a) adjusting a first cam system to engage the stem adjacent the closed valve position;
   b) adjusting a second cam system to engage the stem adjacent the opened valve position;
   c) indicating a closed-valve state by displacing the first cam system in the closing direction with the stem to the closed valve position;
   d) indicating an open-valve state by displacing the second cam system in the opening direction with the stem to the opened valve position; and
   e) indicating an intermediate-valve state in the absence of engagement of the stem with the first and second cam system by biasing the first cam system in the opening direction and biasing the second cam system in the closing direction.

20. The method of claim 19, wherein the step (a) comprises adjusting a member on a rod of the first cam system, the member capable of engaging the stem.

21. The method of claim 20, wherein adjusting the member on the rod comprises rotating the rod to move a ring threaded on the rod, the ring defining a split fitting in a track on the first cam system.

22. The method of claim 19, wherein the step (c) comprises displacing a visual indicator in the closing direction to a minimum level by biasing the visual indicator in the closing direction and removing counter-forces on the visual indicator.

23. The method of claim 19, wherein the step (c) further comprises actuating an open-valve indication switch.

24. The method of claim 19, wherein the step (d) comprises displacing a visual indicator in the opening direction to a maximum level by engaging the second cam system with the visual indicator.

25. The method of claim 19, wherein the step (d) further comprises actuating a closed-valve indication switch.

26. The method of claim 19, wherein the step (e) comprises displacing a visual indicator in the opening direction to an intermediate level by engaging the first cam system with the visual indicator.

* * * * *